(12) United States Patent
Lawrence

(10) Patent No.: US 9,928,844 B2
(45) Date of Patent: Mar. 27, 2018

(54) METHOD AND SYSTEM OF AUDIO QUALITY AND LATENCY ADJUSTMENT FOR AUDIO PROCESSING BY USING AUDIO FEEDBACK

(71) Applicant: INTEL CORPORATION, Santa Clara, CA (US)

(72) Inventor: Sean J Lawrence, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 136 days.

(21) Appl. No.: 14/929,238

(22) Filed: Oct. 30, 2015

(65) Prior Publication Data

US 2017/0125026 A1    May 4, 2017

(51) Int. Cl.

| | |
|---|---|
| *H04N 21/233* | (2011.01) |
| *H04N 21/422* | (2011.01) |
| *H04N 21/439* | (2011.01) |
| *H04N 21/442* | (2011.01) |
| *H04N 21/6336* | (2011.01) |
| *H04N 21/6543* | (2011.01) |
| *H04W 72/04* | (2009.01) |
| *H04W 72/08* | (2009.01) |
| *G10L 19/16* | (2013.01) |
| *G10L 19/005* | (2013.01) |
| *H04J 3/06* | (2006.01) |

(52) U.S. Cl.
CPC .......... *G10L 19/167* (2013.01); *H04J 3/0632* (2013.01); *H04N 21/233* (2013.01); *H04N 21/42203* (2013.01); *H04N 21/4392* (2013.01); *H04N 21/4424* (2013.01); *H04N 21/6336* (2013.01); *H04N 21/6543* (2013.01); *H04W 72/0446* (2013.01); *H04W 72/087* (2013.01); *G10L 19/005* (2013.01)

(58) Field of Classification Search
CPC .............. G10L 19/167; G10L 19/005; H04W 72/0446; H04W 72/087; H04J 3/0632; H04N 21/233; H04N 21/42203; H04N 21/4392; H04N 21/4424; H04N 21/6336; H04N 21/6543

See application file for complete search history.

(56) References Cited

U.S. PATENT DOCUMENTS

| | | | |
|---|---|---|---|
| 6,778,671 B1 * | 8/2004 | Graumann | H04B 3/23 379/406.01 |
| 6,862,298 B1 | 3/2005 | Smith et al. | |
| 8,630,426 B2 | 1/2014 | Svendsen | |
| 2004/0193762 A1 * | 9/2004 | Leon | H04L 29/06027 710/52 |
| 2010/0235486 A1 * | 9/2010 | White | H04L 43/0858 709/223 |

(Continued)

OTHER PUBLICATIONS

Friedman et al., "RTP Control Protocol Extended Reports (RTCP XR)", Internet Engineering Task Force; https://toolsiettorg/html/rfc3611; Nov. 2003, 55 pages.

(Continued)

*Primary Examiner* — Sonia Gay
(74) *Attorney, Agent, or Firm* — Green, Howard & Mughal, LLP

(57) ABSTRACT

A system, article, and method of audio quality and latency adjustment for audio processing by using audio feedback.

24 Claims, 11 Drawing Sheets

(56) References Cited

U.S. PATENT DOCUMENTS

| | | | |
|---|---|---|---|
| 2011/0176060 A1* | 7/2011 | Lee | H04L 1/0001 |
| | | | 348/723 |
| 2011/0249847 A1 | 10/2011 | Salvetti et al. | |
| 2013/0100968 A1* | 4/2013 | Vafin | H04L 65/80 |
| | | | 370/517 |
| 2013/0223538 A1 | 8/2013 | Wang et al. | |
| 2014/0362830 A1 | 12/2014 | Verger et al. | |
| 2016/0014537 A1* | 1/2016 | Lehnert | H04R 29/008 |
| | | | 381/58 |
| 2016/0036564 A1* | 2/2016 | Krishnan | H04L 1/008 |
| | | | 714/748 |
| 2017/0063704 A1* | 3/2017 | Krinsky | H04L 47/283 |

OTHER PUBLICATIONS

International Search Report and Written Opinion for International Patent Application No. PCT/US2016/050798, dated Dec. 23, 2016.

* cited by examiner

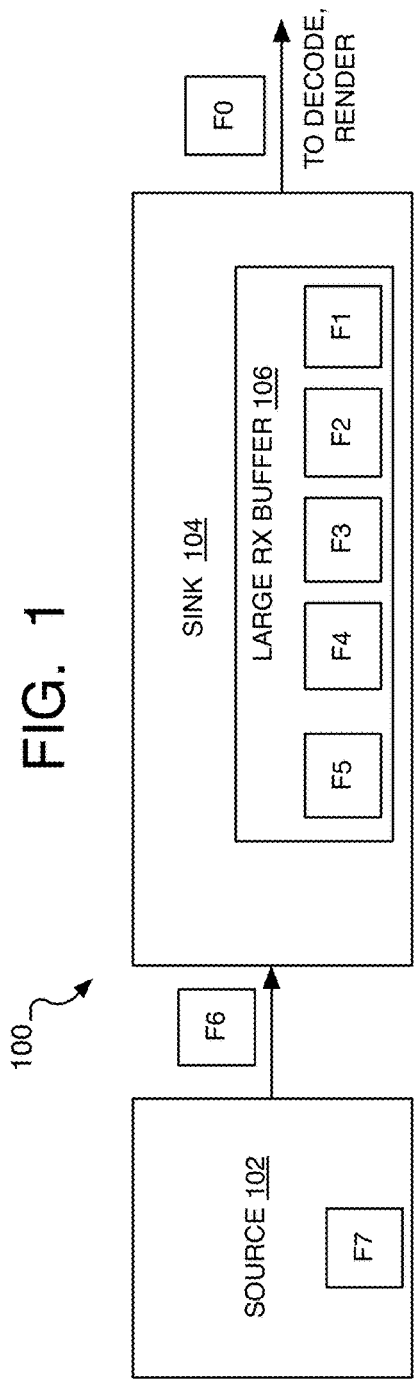
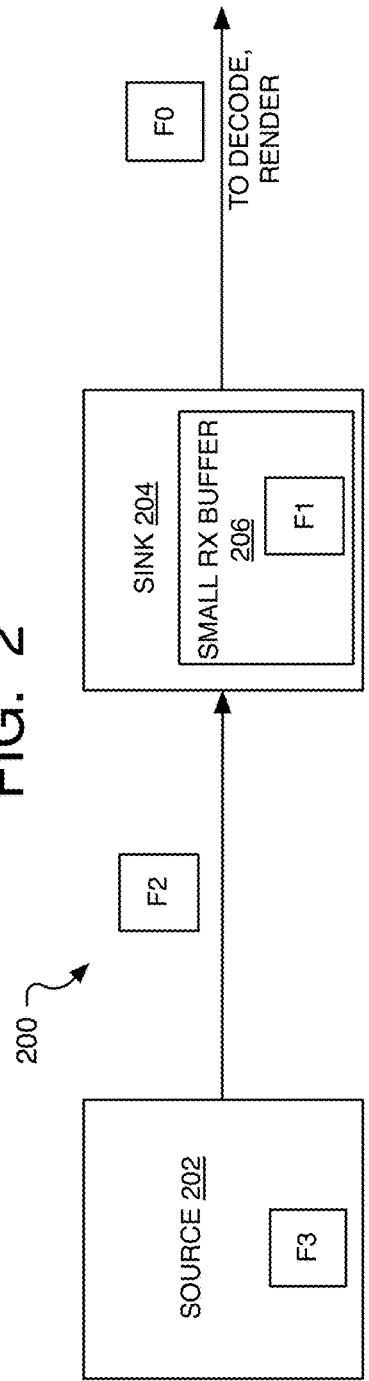

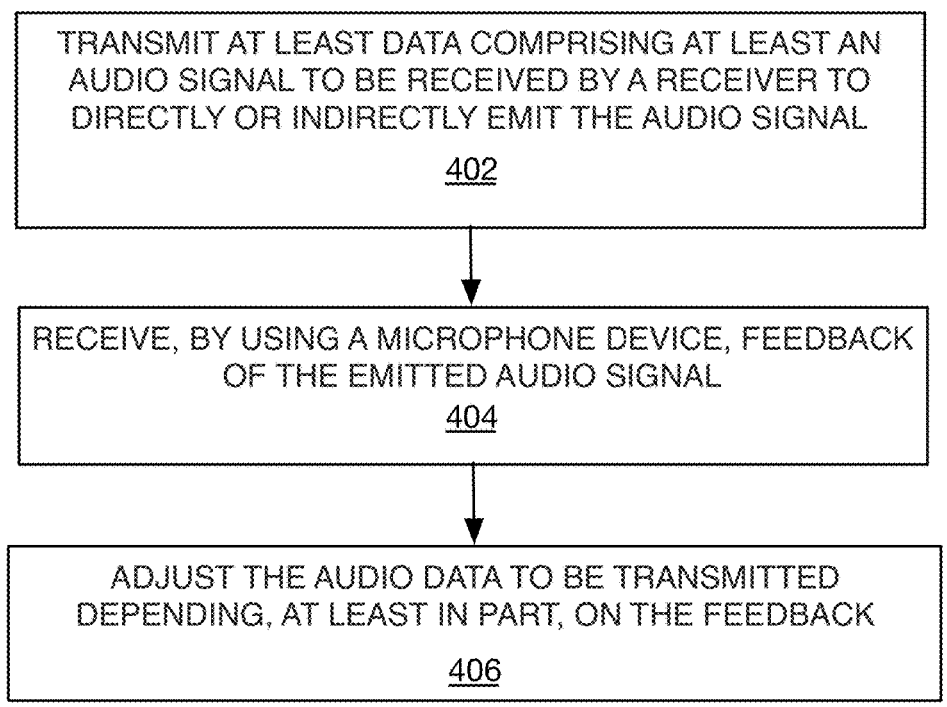

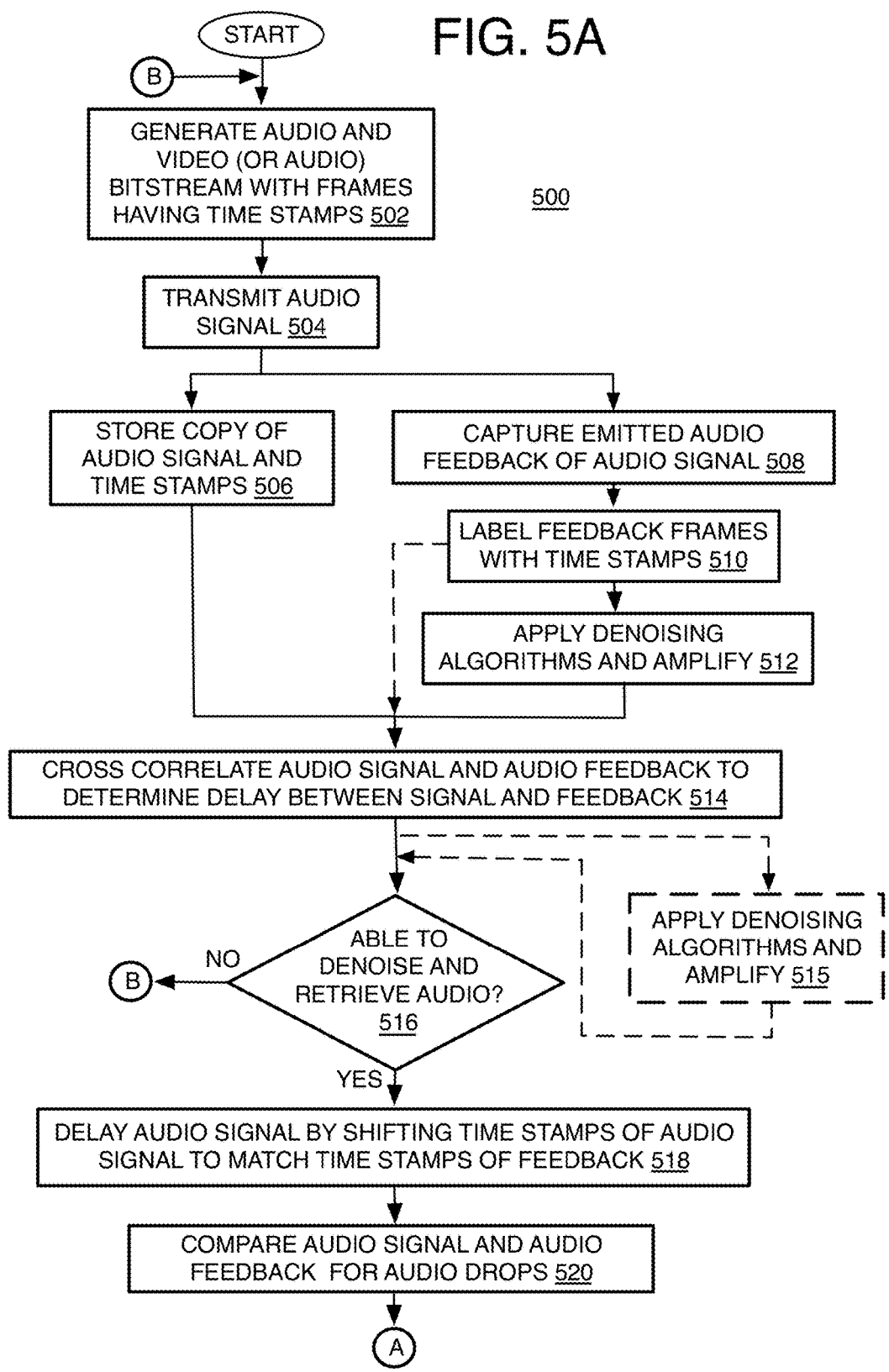

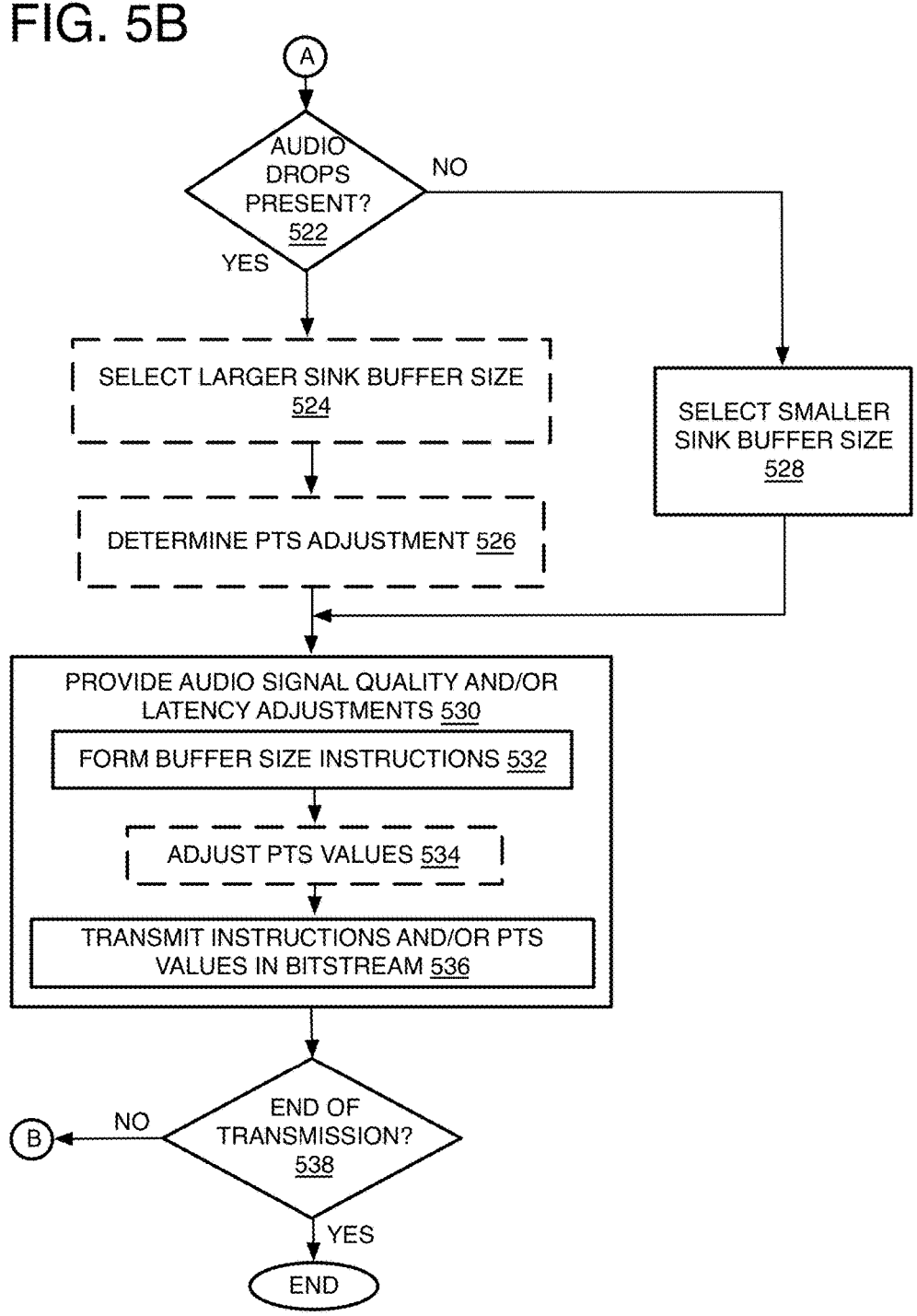

METHOD AND SYSTEM OF AUDIO QUALITY AND LATENCY ADJUSTMENT FOR AUDIO PROCESSING BY USING AUDIO FEEDBACK

BACKGROUND

A number of short-range or personal area network (PAN) mirroring systems transmit video and/or audio files, or otherwise what is viewed on the screen and audible on a transmitting device, and typically to a remote receiving device that is more convenient or provides a better experience for viewing or listening to the video and/or audio. For example, a movie may be played or processed on a smartphone while viewing the video of the movie and listening to the audio on a large television. In other examples, the screen of a laptop may be transmitted to a conference room projector, or a cable box may transmit a show to a smaller device such as a tablet in addition to, or instead of, the television.

In order to transmit media that includes audio data, these PAN systems establish a balance between audio quality and latency. Specifically, in order to raise the quality of the audio, a sufficient number of frames associated with packets of audio data, or video and audio data, are stored in a jitter buffer (or more accurately, de-jitter buffer) at the receiving (or sink) device ready for decoding and rendering (display of video and emission of audio through one or more speakers). The buffer holds the frames until a decoder is ready for the frames. If the buffer is too small, frames that arrive early at the receiver are dropped when there is no capacity to hold the frames in the buffer. On the other hand, when the frames are late according to the decoder's clock at the receiver, the frames also are dropped instead of being stored in the buffer, and these late arrival drops may occur regardless of the size of the buffer. Either way, the dropped frames may cause audio drops that create a pause in the audio (and may indicate a pause in the video) that can be noticeable to a user especially when a sequence of frames is dropped.

To at least resolve issues with a small jitter buffer, the jitter buffer capacity may be increased. The larger the jitter buffer for storing more frames, however, the greater the latency between the display (or processing) of a video and audio on the transmitting device and the rendering of the video and audio on the receiving device due to the time it consumes for a frame to be fetched in a certain order (such as first-in, first-out (FIFO)) from the buffer. The latency may result in noticeable delays in a video display and audio emission, or becomes difficult or even impossible to use the transmitting device to control what is viewed on the receiving device (such as with video games or by controlling a cursor at the source and that is viewed at the receiver). The conventional mirror systems still inadequately compensate for changes in streaming delays from the transmitter to the receiver resulting in too many audio drops or too much latency.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 1 is a schematic diagram of an audio processing system with a large jitter buffer;

FIG. 2 is a schematic diagram of an audio processing system with a small jitter buffer;

FIG. 4 is a flow chart of a method of audio quality and latency adjustment for audio processing by using feedback FIGS. 5A-5B is a detailed flow chart of a method of audio quality and latency adjustment for audio processing by using feedback.

DETAILED DESCRIPTION

Figure 3:
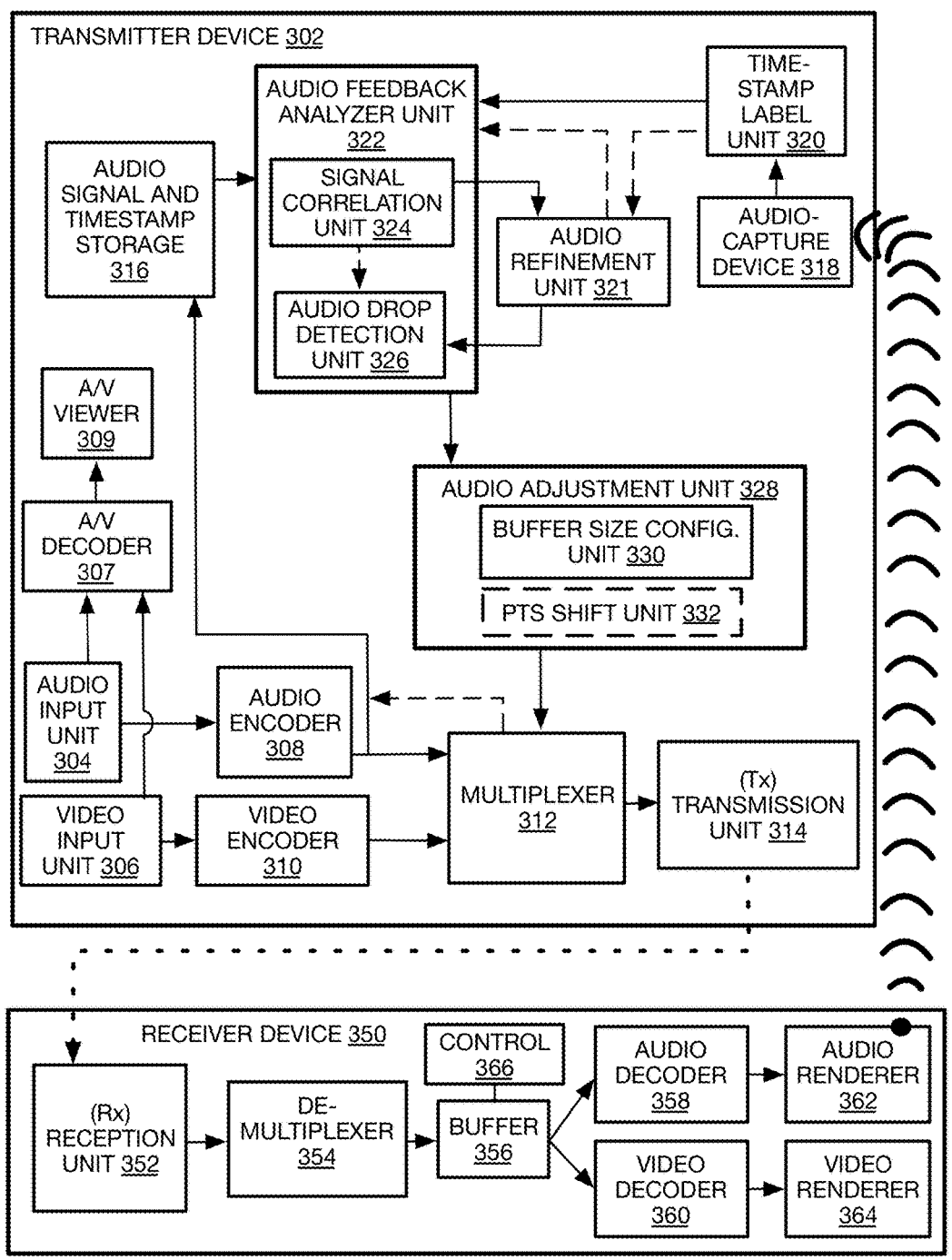
FIG. 3 is a schematic diagram of an audio and video processing system.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as laptop or desktop computers, tablets, mobile devices such as smart phones and other wearable smart devices such as smartglasses, smart watches, exercise bands, or smart headphones, video game panels or consoles, high definition audio systems, surround sound or neural surround home theatres, television set top boxes, projectors, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of audio quality and latency adjustment for audio processing by using feedback.

A number of short-range mirroring or PAN systems provide a way to transmit images and the accompanying audio (or audio alone) from a transmitting device to a remote receiving device for viewing and listening, The transmitting device may be processing or playing the video, and processing the audio, during the transmission to the receiver. For example, a movie may be played on a smartphone while both viewing the video of the movie and listening to the audio on a large television. In other examples, the screen of a laptop may be transmitted to a conference room projector, or a cable box may transmit a show to a smaller device such as a tablet in addition to, or instead of, the television. By another example, audio being played on a small device such as a smartphone may be streamed to a remote speaker that amplifies and emits the sound. Other examples include short range wireless displays with wireless docking. These systems are often described as wirelessly replacing the connection wire from the computer to the display and/or speaker.

Referring to FIG. 1, as mentioned, these mirroring systems attempt to establish an acceptable balance between audio quality and latency. Specifically, a number of frames associated with audio packets (or video and audio packets) are stored in a buffer, such as a jitter buffer, at the receiving (or sink) device and ready for decoding and display or audio emission through one or more speakers. The buffer may be relatively large so that the buffer has the capacity to hold frames that arrive early and cannot be immediately fetched by the decoder and renderer of the receiver. When the buffer has a small capacity, however, frames that are too early are dropped more frequently causing audio drops which are points in time with no or distorted sound and that may be noticeable to a user. When a sequence of frames is dropped, this can create a noticeable pause in the audio or AV.

Thus, in one example for explaining this difficulty, an audio, or audio and video (AV) processing system 100 may have a transmitter or source 102 that has audio or AV encoded and placed in a bitstream. The bitstream is then transmitted or wirelessly streamed to a receiver or sink 104. The sink 104 may have a large receiver (Rx) buffer 106, such as a jitter buffer. As shown, frames F0 to F7 of an audio sequence or AV sequence are being processed ultimately for decoding and rendering. Frame F7 may be being processed for display at the transmitter as well as in the encoding process for placement into the bitstream. Frame F6 is being transmitted in the bitstream, while frames F1 to F5 are sequentially held in the buffer 106, and frame F0 was removed from the buffer as the first frame in the sequence, and for decoding and rendering. This larger buffer 106 increases audio quality by providing more capacity for early frames resulting in fewer audio drops and better playback quality.

On the other hand, increasing the capacity of the jitter buffer has some disadvantages as well. Since the frames are fetched from the buffer 106 in FIFO order for example and are delayed for the time it takes to get through the buffer (to obtain frames F1 to F5 one-by-one in the buffer 106 for example), the larger the capacity of the buffer for holding frames or packets with audio data, the greater the latency which is measured as the time between the playing or processing of a video and audio on the transmitting device (frame F7 for example) and the rendering of the audio or AV on the receiving device (frame F0 for example) such that noticeable delays in audio and video may occur. As mentioned above, the delays may be so severe that noticeable pauses and drops may occur during the rendering of the audio or AV, and attempting to control the audio and video displayed by the receiver by using inputs at the transmitter (such as attempting to fast forward or rewind the audio and video to a certain place in the AV sequence) may be very difficult if not impossible.

Referring to FIG. 2, thus, achieving low latency streaming of audio and video is particularly important in desktop or screen mirroring scenarios and is performed by use of a smaller jitter buffer at the sink so that a minimal amount of audio and video packets are stored in the buffer before decode and render. By one specific example, an audio (or AV) processing system 200 may have a source 202 that streams AV or audio alone to a sink 204 that has a small Rx Buffer 206 here shown only holding a single frame F1. By this arrangement then, the small jitter buffer 206 at the receiver would result in low latency where only four frames (F0 to F3) represent the latency from display or processing on the transmitter to the rendering on the receiver. In this case, however, since the buffer has such a small capacity, frames or packets that are early may be dropped when there is no space for the frame in the buffer. This results in more audio drops (and video drops if present) which may result in noticeable skips in the audio as well as video if present. As mentioned, increasing the buffer size is used to attempt to reduce the number of audio drops.

The tradeoff between latency and playback quality is conventionally handled in one example by using transmitters with optimized or default settings that are specifically configured for certain receivers (such as receiver product types or models with particular components) to achieve optimum playback quality with the lowest latency possible. When the transmitters, however, are used with other receivers that have different data pipeline settings than what is expected by the transmitter, or the specified receivers are not performing as predicted, often the result is a large latency or poor playback quality that is sufficiently significant to affect the user experience.

Otherwise, adaptive jitter buffers are used that have a variable capacity but the capacity is set by calculating the average clock interval for a certain amount of data so that the buffer size may be optimized to play data at an adjusted clock rate to increase audio quality. Such a system, however, does not test the actual emitted quality of the audio, and therefore, is often inadequate.

Another difficulty that arises is when the frames in the transmitted bitstream arrive too late to the sink. This may occur due to the load on the transmitter or due to congested WiFi or wireless display (WiDi) networks. The audio or AV packets that arrive late at the sink still may be dropped and not rendered. This occurs in the conventional system because the receiver determines whether the presentation time stamp of an audio packet is within a margin of the current clock value of the decoder. When the time is within the margin, the frame or audio packet is placed in the buffer for subsequent decoding and rendering. When frames are late to the receiver and the margin limit of the decoder clock has passed, the receiver will drop the late frames even when there is capacity for the frames in the buffer. In this case, the buffer capacity is irrelevant. The dropping of the late frames, as with dropping early frames, also may cause noticeable pauses or annoying breaks in the audio or AV being rendered, or may result in difficulty controlling the audio and video on the receiver by using controls at the transmitter.

To resolve these issues, the presently disclosed method and system proposes use of a microphone on, or controlled by, the transmitter (or source) to capture audio emitted by a receiver (sink) and based on audio data provided to the receiver by the transmitter in the first place. Specifically, the transmitter wirelessly transmits an audio bitstream (or AV bitstream) to a receiver to emit the audio through one or more speakers at the receiver (and rendering of the video on a display at the receiver if present) so that users can hear the audio (and see video if video accompanies the audio). The transmitter can then capture the emitted audio as a feedback signal (also referred to herein as feedback audio signal or simply feedback) from the receiver and of the original audio signal transmitted. The transmitter, or at least the microphone controlled or communicating with the transmitter, should be physically located within the audible range of the receiver, and will often be located within the same room in a building or at least within a close proximity for short-range PAN-type mirroring systems anyway. It will be appreciated that the term feedback used herein refers to the sound, sound waves, and/or resulting signal that is formed by using the sound waves emitted from a speaker-type device on or communicating with the receiver and that is emitted into the ambient air.

The feedback is then compared to the audio as transmitted from the transmitter. Depending on the differences between the feedback and the transmitted audio signal, various decisions can be made to adjust the transmitter-receiver pipeline settings to achieve the best balance between playback quality and latency. Specifically, the transmitter can transmit data to control the capacity of the buffer at the receiver. Thus, the transmitter can configure a frame buffer at the receiver to increase the number of frames that can be held at the buffer to reduce audio drops and to improve the audio quality of the audio emission, or reduce the number of audio frames that can be held at the buffer to decrease the latency between the display or processing of the video and audio at the transmitter and the display and emission of the audio at the receiver to reduce pauses in the audio and display.

The presentation timestamps (PTS) of the transmitted frames also may be modified to reduce the audio drops caused by frames arriving late to the sink. In more detail, if the PTS of a frame is earlier (or less than) the decoder clock so that the PTS is not within an acceptable margin of the decoder clock, the frame is considered having arrived late to the receiver and the de-multiplexer will drop the late frames rather than placing the late frames in the buffer to present the audio and video data of the frame for rendering, which causes the audio drops and AV pauses mentioned above. When the PTS of a frame is within the margin of the decode clock, the frame is placed in the buffer and subsequently sent for decode and render when the frame PTS matches the decode clock. Thus, to handle late frames, the PTS may be shifted by increasing the PTS value so that the PTS can be set within the acceptable margin for placement in the buffer sooner than simply waiting for the PTS numbers to catch up, which may or may not happen on its own, and which may result in a significantly greater number of audio drops.

Referring now to FIG. 3, an AV processing system 300 may perform the implementations of adjusting audio quality and latency by using feedback as described herein. While the example of system 300 is explained as an AV processing system, it will be understood that at least some of the aspects of the methods and system described herein may operate on a system that is only using an audio signal without video. System 300 discloses a data pipeline of an audio-video mirroring system which may be a screen mirroring system or personal area network (PAN). Particularly, a transmitter device (or just transmitter or source) 302 may be communicatively coupled or paired to a remote receiver device (or sink or simply receiver) 350 to transmit a bitstream with either an audio data signal alone or an audio-video (AV) data signal to the receiver device 350. The methods herein are particularly suited for wireless transmission of the AV bitstream but some implementations may be wired. For AV systems, the transmitter 302 may be a smartphone, tablet, laptop computer, or other computer that transmits both audio and video and/or audio alone.

By one implementation, the transmitter 302 has an audio input unit 304 and, when video processing is provided, a video input unit 306. The audio and video for the input units may be obtained from a wide variety of upstream sources. This includes from volatile or non-volatile memory on the transmitter or accessible by the transmitter, audio and video streamed to the transmitter over wide area networks (WANs) such as the internet and/or other telecommunications networks, or provided over local area networks (LANs) such as that within an office, residence, or other facility. The transmitter and receiver also may be, may be part of, or may have one or more cameras and audio capture devices such as one or more microphones. In some implementations, the image capture operations accompanying audio capture of original content would be off or already completed so that original audio would not interfere with the feedback coming into the microphone at the transmitter. It is contemplated, however, that if a separate microphone could be used to capture audio or an audio filtering system is provided to differentiate between feedback and original audio at a single microphone, then the camera and microphone operations could be used during operation of the present methods and system. Many arrangements are possible.

Once obtained from the audio and video input units 304 and 306, the audio and video data streams may be respectively provided to an audio encoder 308 and a video encoder 310. Additionally, when the transmitter 302 has the capability to display and/or play audio and video input, the transmitter 302 may have an AV decoder 307 that provides decoded AV data to an AV viewer 309. Thus, in some cases it may be possible to view the video on the transmitter while also viewing the video on the receiver. In some cases, the viewer may be turned off while paired to the receiver, and in either case, the audio to such a viewer or player 309 may be turned off so that audio emitted by the transmitter 302 cannot interfere with the feedback from the receiver. The AV decoder 307 may implement a codec compatible with that implemented by AV source upstream of the transmitter when so provided and to generate audio and video data streams which are then (re)encoded by the encoders 308 and 310 suitable for direct wireless transmission to receiver 350.

Encoders 308 and 310 may receive audio data and video data inputs in digital form, respectively, and may output a compressed (coded) digital audio data stream and digital video data stream, respectively, as a representation of the inputs. The input units 304 and 306, or encoders 308 and 310, also may perform pre-processing on the data sufficient for the encoders to compress the data. The encoders 308 and 310 may implement any codec known to perform one or more of transformation, quantization, motion compensated prediction, loop filtering, and so forth. In some implementations, audio encoder 308 complies with one or more pulse code modulation (PCM) or linear pulse code modulation (LPCM) specifications such as 20 Digital Dolby AC-3, Dolby TrueHD, or Advanced Audio Coding (AAC), and so forth. In some implementations, video encoder 310 complies with one or more specifications maintained by the Motion Picture Experts Group (MPEG), such as, but not limited to, MPEG-1 (1993), MPEG-2 (1995), MPEG-4 (1998), and associated International Organization for Standardization/ International Electrotechnical Commission (ISO/IEC) specifications. In some exemplary implementations, encoders 308 and 310 comply with one or more of H.264/MPEG-4 AVC standard, HEVC standard, VP8 standard, VP9 standard specifications, and so forth.

System 300 also may include a multiplexer 312 to multiplex the coded elementary streams into a higher-level packetized stream that further includes a metadata field specifying a presentation synchronization of the elementary stream packets. In some implementations, multiplexer 312 codes the packetized elementary streams (PESs) into an MPEG program stream (MPS), or more advantageously, into an MPEG or multiplexed transport stream (MTS). A presentation timestamp (PTS) that is set to the value of the encoder clock and is part of the output of the encoders for placement in the MPEG transport stream or MTS for each frame (or each audio and/or video packet) may be assigned in the PES packet layer and used by a receiving device to set the presentation time of a given video packet and audio packet that is associated with a single frame by one example. In further implementations, the MTS is encapsulated following one or more of Real-Time Protocol (RTP), user datagram Protocol (UDP) and Internet Protocol (IP) as implementations are not limited in this context. In some RTP implementations for example, a Network Abstraction Layer (NAL) encoder (not depicted) receives the MTS and generates Network Abstraction Layer Units (NAL units) that are suitable for wireless transmission. While exemplary implementations described in detail herein make reference to "PTS", metadata or MTS fields of a different name but nonetheless used to set the presentation time may be similarly used. For example, where an RTP payload is a PES rather than a MTS, the RTP timestamp may serve to set the presentation time of a given audio and video frame.

The transmitter 302 also may include a (Tx) transmission unit 314 that may form a WIFI/or other network transmitter stack and may be a wireless transmission device to obtain the coded stream data from the multiplexer 312 and then to output a wireless signal representative of the coded stream data to a sink device 350, and in one form, directly to the sink 350. Wireless transceiver 105 may utilize any band known to be suitable for the purpose of directly conveying (e.g., peer-to-peer) the stream data for real time presentation on a sink device. The transmission unit 314 may operate in the 2.4 GHz and/or 5 GHz band (e.g., Wi-Fi 802.11n), and in some forms in the 60 GHz band. The transmission unit 314 may further support and/or comply with one or more High Definition Media Interface (HDMI) protocols, such as Wireless Home Digital Interface (WHDI), Wireless Display (WiDi), Wi-Fi Direct, Miracast, WirelessHD, or Wireless Gigabit Alliance (WiGig) certification programs.

The audio signal may be obtained from the output of the audio encoder 308 and may be saved in a storage 316. Transmission time stamps of the frames of the audio signal, which may or may not be the same as the presentation time stamps (PTSs), may be obtained from the multiplexer and saved with the saved audio signal. An audio feedback analyzer unit 322 may use this saved copy of the audio signal (which will become the delayed audio signal) to compare to the feedback to determine when audio drops exist in the feedback as explained below.

Turning for now to the receiver or sink, the receiver device 350 may be any compatible device that at least emits sound, and in most forms, also displays images and/or video, and is communicatively coupled or paired to the transmitter 302 to receive a wireless transmission of audio and video data. To accomplish these features, the receiver 350 may have a Rx reception unit 352 that receives and forms a WiFi or other network receiver stack of the frames of audio and video from the transmitted bitstream. The transmitted audio data may be referred to as the transmitted audio signal herein (to differentiate from the feedback). The reception unit 352 may use any frequency band and wireless communication protocol compatible with that of the transmission unit 314. The output of the reception unit 352 is provided to a de-multiplexer 354, which is to process the encapsulated packetized streams into separate audio and video compressed data inputs. De-multiplexer 354 includes logic to unencapsulate and extract audio and video payloads from the packetized AV stream. In one form, de-multiplexer 354 includes logic to de-multiplex the packet payloads based, at least in part, on the MTS field specifying the presentation time stamps of the elementary stream packets. Particularly, as explained herein, the demultiplexer may extract the PTS of each audio and video packets for a frame, and compare the PTSs to the decoder clock. When the frame is within a certain margin of the decoder clock, the frame, and its associated audio and video packets are placed in a buffer 356, which may be a jitter buffer. When the frame is late relative to the margin of the decoder clock, that frame is dropped, and when the frame is early and the buffer has no capacity for the frame, the frame also is dropped in this case.

The buffer 356 may be or have a dynamic jitter buffer and may include multiple buffers with one buffer for each PES, or in other words, one audio buffer for audio data packets and a video buffer for video data packets. The buffer 356 may be formed by writing the data to memory whether a permanent memory or a temporary memory such as RAM, cache or any other memory that can provide a sufficient transaction speed and capacity, and may or may not be considered a main memory. A buffer control 366 may be provided to control the size of the buffer when the buffer is a dynamic buffer, and may be activated by instructions in the bitstream received from the transmitter. On example jitter buffer protocol for real-time transport protocol (RTP) control protocol (RTCP) is provided by Friedman et al., *RTP Control Protocol Extended Reports* (*RTCP XR*), Internet Engineering Task Force (November 2003) (also found at https://tools.ietf.org/html/rfc3611). Many other buffer standards and protocols may be used as well.

Audio decoder 358 and video decoder 360 may retrieve a frame from the buffer 356 when the PTS of the frame matches the decoder clock. Decoders 358 and 360 may use any codec compatible with that of encoders 308 and 310 to generate decoded digital audio data and digital video data that represents the input data. Thus, the decoded data provided by the audio decoder 358 represents the input audio and in turn the audio signal transmitted in the bitstream to the receiver 350. Audio renderer 362 receives the audio data and forms an audio rendering pipeline that may terminate at one or more audio speakers. The audio renderer 362 may include any equipment that modifies or enhances the audio data before the audio is emitted from one or more speakers in the form of sound waves into the ambient air. This may include amplifiers, equalizers, and so forth. The type and configuration of speaker also is not limited and may be many different types as long as the source is able to capture the feedback from the receiver/sink and convert the sound waves into a signal that can be analyzed by the transmitter device.

The audio or sound emitted by the audio renderer 362 at the receiver 350 is captured or picked up by an audio capture device 318 such as a microphone device at the transmitter 302. As mentioned, the transmitter 302 should be placed within the audible range of the receiver 350 so that the microphone 318 captures a sufficient amount of feedback to be able to analyze the captured feedback of the audio signal that was previously transmitted in the audio data of the bitstream and rendered at the receiver 350. The transmitter 302 is often placed in the same room or otherwise nearby the receiver 350 due to the conventional transmission range requirements of a PAN or screen mirroring network anyway.

A time stamp label unit 320 at the transmitter 302 provides an arrival time stamp for each of the frames of the captured feedback for comparison to the saved audio signal held in storage 316. This time stamp signifies the time a frame arrived at the transmitter device 302.

The feedback then may be provided directly to the audio feedback analyzer unit 322, or alternatively may be provided to an audio refinement unit 321 for at least denoising and amplification. When the feedback is provided from the microphone 318 and label unit 320 without refinement, the audio feedback analyzer unit 322 may provide the feedback to the audio refinement unit 321 after the feedback is provided to a signal correlation unit 324 but before the feedback is provided to an audio drop detection unit 326 as described below.

The audio feedback analyzer unit 322 uses the signal correlation unit 324 to properly align the saved audio signal to the feedback to determine which frames in the audio signal match frames in the feedback. Once the saved audio signal and feedback are aligned, the saved audio signal may be delayed (or its time stamps shifted) to align with the feedback for the comparison. The audio drop detection unit 326 then performs the comparison of the delayed audio signal with the feedback to determine whether audio drops exist in the feedback.

The results are then provided to an audio adjustment unit 328. This unit may have a buffer size configuration unit 330 that determines whether to provide instructions to increase the buffer size of the buffer 356 at the receiver when audio drops are present in the feedback and the frames are considered to be arriving early at the buffer and to increase audio quality, or whether to decrease the size of the buffer 356 when an insignificant amount of audio drops exist in the feedback to reduce latency. Either the audio adjustment unit or the multiplexer 312 may form the instructions to place into the outgoing bitstream with a new audio signal in order to activate the receiver to adjust the size of the buffer 356 accordingly.

Also, a PTS shift unit 332 may be provided to increase audio quality and that shifts the PTS values of the outgoing audio signal when it is determined that audio drops exist in the feedback and the frames are considered to be arriving late to the buffer 356. In this case, the multiplexer 312 may adjust the PTS values obtained from the output of the encoder (or upstream) and adjusting those PTS values by a PTS offset or error value from the PTS shift unit. The multiplexer may place the adjusted PTS value in the MTS during placement of the frames in a bitstream (as in packets for example) for transmission to the receiver as explained in detail below.

Referring to FIG. 4, an example process 400 for a computer-implemented method of audio quality and latency adjustment for audio processing by using feedback is provided. In the illustrated implementation, process 400 may include one or more operations, functions or actions as illustrated by one or more of operations 402 to 406 numbered evenly. By way of non-limiting example, process 400 may be described herein with reference to example audio processing devices described herein with any of FIGS. 3 and 9-12, and where relevant.

Process 400 may include "transmit at least audio data comprising at least an audio signal to be received by a receiver to directly or indirectly emit the audio signal" 402. In other words, this operation is directed to the transmission or streaming of a bitstream with audio data of an audio signal to a receiver that has one or more speakers to emit the audio. The transmission may be wireless, and the transmission may or may not include video as well.

Process 400 also may include "receive, by using a microphone device, feedback of the emitted audio signal" 404. As described in detail herein, the transmitter or source may have a microphone as one example to obtain the emitted feedback from the receiver that receives the transmitted audio signal that originated from the transmitter in the first place. There is no limit to the type of microphone that can be used and is used herein in a generic sense to refer to any sound capturing device.

Process 400 also may include "adjust the audio data to be transmitted depending at least in part, on the feedback" 406. As explained in detail herein, as one example use of the feedback, the feedback is compared to a saved copy of the transmitted audio signal to determine whether the data to be transmitted should be adjusted to increase the quality of the audio or to reduce the latency of the audio. This may be performed by inserting instructions into the data to be transmitted as part of a bitstream for example and that controls the size of a buffer at the receiver. The audio quality can be increased by reducing audio drops in the emitted audio (or feedback). When audio drops exist due to frames arriving early at the receiver's buffer, the instructions may increase the size of the buffer. Otherwise, when audio drops exist due to frames arriving late to the receiver's buffer, the PTS values for the frames or packets may be shifted so that the PTS of the frames of the incoming audio data match a clock at the decoder sooner to reduce the amount of audio drops. When no audio or few audio drops are present, the instructions may decrease the buffer size to attempt to reduce latency between processing or playing of audio (and video if present) on the transmitter and rendering the audio (and video) by the receiver.

Referring to FIGS. 5A-5B, an example computer-implemented process 500 for adjusting audio quality and latency for audio processing by using feedback is provided. In the illustrated implementation, process 500 may include one or more operations, functions or actions as illustrated by one or more of operations 502 to 538 numbered evenly. By way of non-limiting example, process 500 may be described herein with reference to example audio processing devices described herein with any of FIGS. 3 and 9-12, and where relevant.

Process 500 may include "generate audio and video (or audio) bitstream with frames having time stamps" 502. As mentioned, a transmitter may receive input AV sequence streaming from an external network such as the internet, or otherwise may obtain the AV sequence from memory on or accessible to the transmitter. A decoder may or may not be used to process the input AV sequence so that a viewer or audio player may be used to display and/or listen to the AV sequence on the transmitter while also transmitting a bitstream of the AV sequence to a receiver as described herein.

Process 500 may include "transmit audio signal" 504, and as described above, the input audio or AV may be provided as frames that are encoded, and where individual frames, or the packets associated with the frame, are provided with a PTS to be placed in the Multiplexed Transport Stream (MTS) of the audio packets or frames. The PTSs provide the order and timing for the frames of audio (or audio and video). The PTSs are set according to the encoder clock and to be matched to the decoder clock at the receiver. The audio and video of a frame are packed together by a multiplexer and also provided a transmission time stamp before the frames are then placed in a network transmitter stack and into a bitstream before transmission. The transmission may be wireless.

The multiplexer provides the transmission time stamp to individual audio frames or packets and that is considered to indicate when the transmission left the transmitter. This transmission time stamp may be based on the time that frames are output of the multiplexer, or may reflect another time such as the actual transmission of the frames by a transmission unit, or may include an ideal or previously measured time period to transmission of the bitstream. Otherwise, the presentation time stamp (PTS) provided at the output of the encoder could be used as the transmission time stamp as well. By one form, the transmitter and receiver are in the same room or otherwise in close proximity (whether or not in the same room) and are paired in a PAN or mirroring network as already described herein.

Process 500 may include "store copy of audio signal and time stamps" 506, and particularly, the non-coded audio signal, which may be obtained from the audio encoder, or further upstream, is stored at least temporarily where it is accessible by the transmitter to be subsequently compared to the feedback as follows. The transmission time stamps, which may be different than the presentation time stamps as just mentioned, are also stored in a memory for the comparison.

The AV data transmitted from the transmitter and to the receiver is de-multiplexed into separate sequences of audio and video packets associated with the frames. Once separated, the multiplexer may compare the PTS of the audio and video data to the decoder clock. As described, when the PTS of the frames (or audio and video packets separately) are within a certain margin of a current value of the decoder clock, the audio and video data is placed within the audio and video buffers, which may be jitter (or more accurately de-jitter) buffer(s) for subsequent decoding and rendering. The margin is set by a number of known standards. By one form, the buffer margin is dependent on the jitter buffer size, and the point data is read from the buffer (the beginning, middle or end of the buffer). Thus, for example, if the buffer size is 50 ms and data is being read from the middle of the buffer, this margin would be less than or equal to +/−25 ms. Relevant here, when the PTS of the audio packet or frame is larger than the upper limit of the decoder clock margin, the frame is considered early and is dropped unless there is capacity for the frame in the buffer. When the PTS of the audio packet is less than the low limit of the decoder clock margin, the frame is considered late and is dropped regardless of the capacity of the buffer. The receiver then decodes the frames in the buffer and renders the audio and video of the frames by emitting the audio from speakers into the ambient air and displaying the video on a screen either on or coupled to the receiver. As mentioned herein, the present methods may work when audio is being emitted without video as well.

Then, process 500 may include "capture emitted audio feedback of audio signal" 508. For this operation, the transmitter may have or be in control of a microphone or other audio capture device as described herein and that changes the sound waves from the ambient air into an audio feedback signal (or just feedback).

Process 500 may include "label feedback frames with time stamps" 510 such that the feedback signal may be divided into frames, and each frame may be provided a time stamp that indicates when the feedback was received by the transmitter through the microphone. The time stamp may not necessarily represent the exact time the microphone received the feedback but may simply be a representation of the reception, and may actually be the time that a time stamp unit or other unit of the transmitter receives the feedback.

Process 500 may include "apply denoising algorithms and amplify" 512. By one option, the raw feedback is provide to a feedback analyzer unit directly to correlate the feedback to the saved and delayed audio signal. In that case, the feedback is refined for comparison to the delayed audio signal after the correlation operation. By other forms, the feedback refinement takes place before the correlation operation. In either case, the feedback may be denoised to attempt to remove any sounds resulting from exposure to the ambient air or due to other undesirable noises. The feedback also may be amplified to change the power, and in turn the frequency, of the feedback signal to match the parameters of the delayed audio signal for an easier comparison of the feedback to the delayed audio signal.

Process 500 may include "cross correlate audio signal and audio feedback to determine delay between signal and feedback" 514. This operation is performed to determine which parts of the saved audio signal and the feedback match in order to perform a comparison of the saved audio signal and feedback. Another way to say this is that this operation temporally aligns the saved audio signal with the feedback. Once the audio signal and feedback are temporally aligned, the correlation operation includes determining the delay between the feedback and the delayed or reference audio signal. The delay is the round trip time delay for the audio to be transmitted and captured by the microphone of the transmitter. The saved audio signal can then be shifted by the delay to match the feedback signal for the comparison which is then referred to as the delayed or reference audio signal.

To align the saved audio signal and feedback, by one form, one or both of the two signals are shifted until a sufficient number of points (or frames) along the signals have amplitudes that match within a predetermined threshold. The threshold may be determined adaptively based on the magnitude of the amplitudes of the two signals averaged over a period of time. The threshold may be determined by trial and error. Alternatively, if the difference between the two signals is measured, a threshold value close to zero may be determined, and if the difference falls below this threshold, this would indicate a suitable alignment match. Alternative and more robust methods include correlation of the two signals or windowed versions of the two signals and use of appropriate thresholds (determined similarly as described above) to determine signal match. Other more complex pattern matching algorithms may be utilized depending on the nature of the application. Once the match is established, the difference between the transmission time stamps on the saved audio signal and the time stamps of the feedback is used as the delay for shifting the timestamps of the saved audio signal to form the reference audio signal for the comparison to the feedback.

By another example, there may be a setup-test that transmits data to a receiver paired to the transmitter to determine how long it takes for a signal to return to the transmitter, and whatever delay is determined is set as the delay going forward to shift the time stamps of the saved audio signal to match the time stamps of the feedback for the current transmitter-receiver pairing.

By yet another example, a standard delay may be predetermined for certain equipment and programs used on the receiver. Thus, one or more standard delays may be developed depending on the equipment and programs, used at the receiver, such as televisions with known de-multiplexers, jitter buffers, decoders, renderers, speakers, and so forth. These standard delays then may be used to shift the time stamps of the saved audio signal.

Once the saved audio signal is correlated to the feedback, denoising, amplification, and/or other signal refinement may be applied 515 to the feedback if this refinement has not already been applied as explained above.

Process 500 then may include a test "able to denoise and retrieve audio?" 516. Whether the denoising is included before or after the correlation operation 514, if too much noise still exists in the feedback, the feedback is probably corrupted and cannot be matched to the saved audio signal, and the process loops to obtain a new audio sequence (and video sequence if present) or the next portion of the current audio or AV sequence. The noise will often be due to the presence of ambient noise which could be an issue in making the correct configuration decisions. Considering that most use cases for PAN or mirroring networks would not involve other audio sources in the vicinity, however, the probability of the audio captured by the microphone being contaminated with ambient audio may be low. Even when ambient noise exists, however, the test permits the quality and latency adjustment process to continue by simply waiting until the feedback is sufficiently clean (when the noise is reduced) rather than entirely stopping the process.

The output of the cross correlation also may be used to assist to make a decision on whether the feedback is sufficiently denoised (or in other words, whether the audio was retrievable form the feedback). When the saved audio signal could not be correlated to the feedback, then it is assumed there is too much noise in the feedback, and the test of operation 516 is answered in the negative, and the process proceeds to obtain the next audio sequence. By one example form where denoising occurs after the correlation operation, the correlation may be retried before continuing with the process.

Process 500 may include "delay audio signal by shifting time stamps of audio signal to match time stamps of feedback" 518. Thus, once the correlation operations determines the delay between the saved audio signal and the feedback, the time stamps of the saved audio signal are shifted (or the audio signal is delayed) to match the timing of the time stamps of the feedback. The delayed audio signal can now be compared to the captured feedback. It will be understood that the reverse also may be performed such that the feedback has its timestamps shifted to match that of the saved audio signal instead.

Process 500 then may include "compare audio signal and audio feedback for audio drops" 520. Particularly, the captured audio feedback is then analyzed for possible audio drops to determine if the receiver jitter buffer size and/or PTS values are at acceptable values. Based on the outcome of this analysis, the receiver jitter buffer size and/or PTS values configuration on the transmitter will be adjusted.

Figure 6:
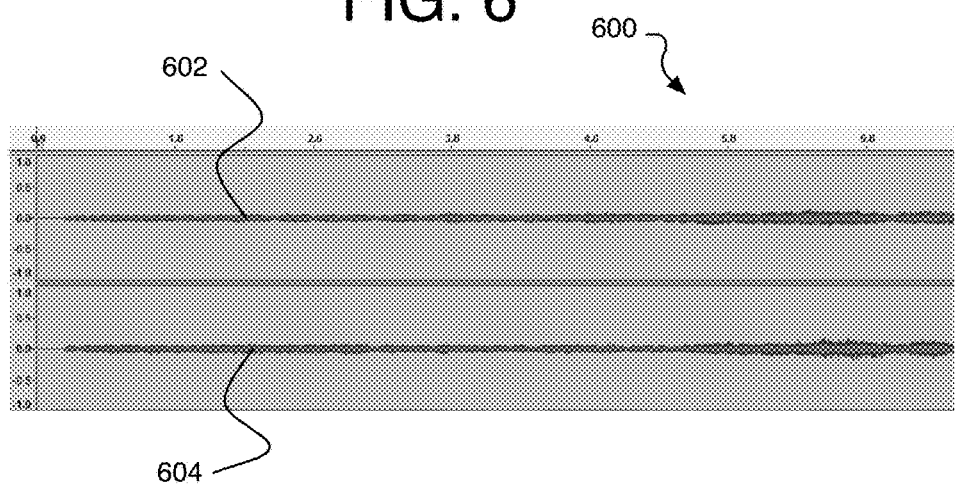
FIG. 6 is a graph of an audio signal at a source before it is streamed to a sink.
Figure 7:
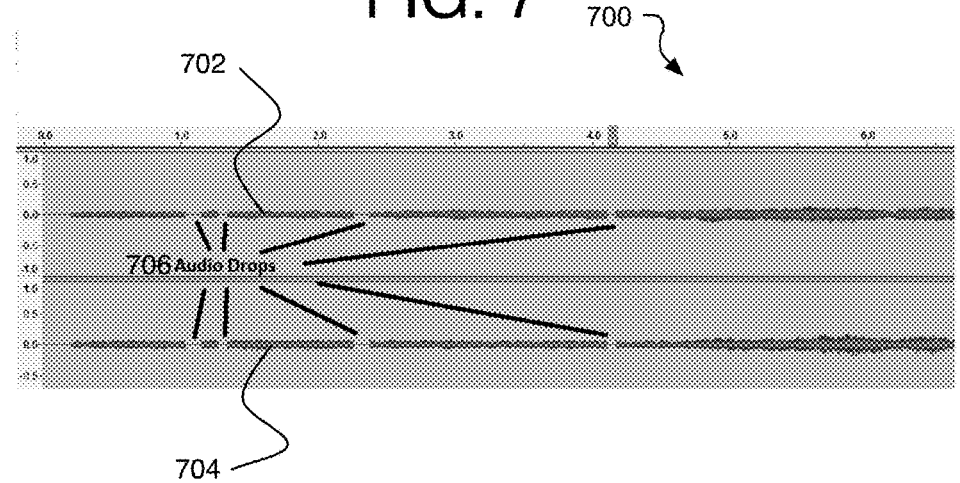
FIG. 7 is a graph of an audio signal captured at a source microphone and then noise reduced and amplified.

Referring to FIGS. 6-7 for example, a two channel audio signal 600 is shown with channels 602 and 604 and located on the transmitter (or source). The signal 600 is shown on a graph with power on the vertical axis and time on the horizontal axis. The signal 600 is shown before streaming to the sink/receiver and becomes the saved and delayed audio signal. A two channel audio signal 700 is the feedback signal for the same audio as the audio signal 600. The feedback 702 and 704 is shown after being captured by the transmitter microphone, noise reduced, delay-compensated, and amplified. The breaks 706 along the feedback 702 and 704 when there are no breaks on the same time periods of the audio signal 600 indicate when audio drops occurred. Presence of audio drops such as these will not result in a good user experience, and hence, the transmitter should make the necessary configuration setting changes to enable better playback quality and less audio drops.

A minimum amount of audio drops during a certain time period may be used as a threshold for requiring audio quality adjustment while a maximum amount of audio drops during a certain time period may be set as the threshold for adjusting for latency. These thresholds may be determined through trial and error, and by one example, is respectively set at drops totaling 10 ms in 5 s of audio (for quality) and drops totaling 100 ms in 5 s of audio (for latency).

Also, detection of audio drops this way also would provide an indication of potential video pauses too. So a jitter buffer size increase to both the audio packet buffer and the video packet buffer at the jitter buffer would benefit both audio and video streaming. This may come at the cost of increased latency. However, the tradeoff here is made automatically on necessity based on performance and is not normally fine-tuned or performed by unchangeable hard coded settings that are optimized to only some pairs of devices. The methods herein may be adaptable to many different devices. Thus, process 500 may include "audio drops present?" 522, and determines whether a sufficient amount of audio drops occur that require an audio quality correction.

If audio drops exist, these could occur due to network congestion, or other computational or transaction load factors internal to the transmitter or receiver that may result in a stalled or slow receiver or decoder pipeline that could also result in audio drops. For any of these cases, a delay may cause frames to be late to the buffer or may cause frames to bunch up and be transmitted with non-uniform timing so that some frames arrive early to the buffer. When it can be determined that the frames arrive early and are dropped due to a small receiver jitter buffer size, the transmitter would transmit instruction to increase the jitter buffer size. Increasing the jitter buffer size would increase the latency. However, it would also account for a larger buffer to store data so that less data would be lost due to early arrival at the buffer at the receiver. On the other hand, when it can be determined that the frames are being dropped because the frames are late to the receiver jitter buffer, the transmitter may shift the PTS of the audio data (and video data if present) to attempt to provide frames on time to the buffer sooner rather than permitting the transmission to catch up to the decoder clock at the receiver on its own (if it happens at all).

By one example, in order to avoid the need to determine whether frames are arriving late or early to the buffer at the receiver when audio drops are detected, a trial and error correction process is initiated, and it is simply assumed one or the other is the cause. Either the jitter buffer capacity is increased or the PTS values are shifted to see if either solution works. Once one solution is attempted and fails, then the other solution is attempted. Once one solution succeeds, then the process continues with the next audio sequence as described below. It also may be possible to detect whether the frames are arriving late or early to the buffer, and the appropriate solution is applied first in that case.

By another option, some combination of both PTS value adjustment and buffer capacity increase may be implemented on a trial and error basis until a solution is successful. In this case it may be assumed that the jitter buffer size increase is a coarse adjustment while the PTS adjustment is a fine adjustment. This may include proceeding with both simultaneously, adjusting both in increments that increase the buffer capacity and increase the PTS values with each attempt. Otherwise, the two solutions may be applied inversely so that a minimum adjustment of one solution is applied and is incremented from that minimum value with increasing values while the maximum adjustment of the other solution is applied simultaneously and incremented with decreasing values from the maximum value. Other combination solutions are possible.

When assuming that the frames are early to the receiver's buffer, process 500 may include "select larger sink buffer size" 524. Once it is determined, or here assumed, that the jitter buffer at the receiver is too small, it may be determined how much to increase the capacity of the jitter buffer. By one form, the capacity may be increased one frame or other interval per adjustment in a trial and error process where the frame capacity is increased until audio drops are sufficiently reduced. By other options, the buffer capacity may be increased by some set number of frames such as 1 to 6 frames, actually set by a time interval such as 10 ms, and adjusted once or other interval per AV session. By other forms, the size will be continuously adjusted based on the feedback.

When assuming that the frames are late to the receiver's buffer in the presence of audio drops, process 500 may include "determine PTS adjustment" 526. Based on the audio drops, a control signal indicative of an audio PTS error or offset is provided to the multiplexer or encoder to adjust or shift the PTS values of the recently encoded AV or audio stream by the offset. By one example, the offset values are determined by known algorithms, or may be determined by trial and error starting with a range of possible offset values. By one example, the PTS offset values may be based on the audio-video synchronization values. Specifically, optimal values for AV synchronization are based on certain standards for example: (1) ITU BT.1359 is −30 ms+22.5 ms, (2) ATSC IS/191 is −45 ms+15 ms, (3) EBU R37 is −60 ms+40 ms to name a few examples, and where '−' indicates audio lagging video and '+' indicates audio leading video. The subjective limit where a person may notice sync loss is about −185 to +90. Thus, the audio PTS may be shifted using one of the example range limits or a value smaller than the limits such as 10 ms. The PTS then may be increased by that value until the audio drops are reduced to an acceptable level. If the audio drops are not reducing, then the jitter buffer size may be changed instead if not attempted already. These AV sync consideration may be particularly important when the corrections being made based on audio feedback will also impact video too in an AV system.

When there are no audio drops, or a relatively low number of audio drops, process 500 may include "select smaller sink buffer size" 528. If there are no or few audio drops detected, the transmitter may send instructions to decrease the receiver jitter buffer size to reduce the latency and push the playback quality and occurrence of AV drops to its limit. As mentioned earlier, presence of no or few audio drops in the microphone captured feedback would indicate that latency could be further reduced with potentially no impact to playback quality unless the buffer size is at the limit where further reduction in latency (by reducing the jitter buffer size) would result in audio/video drops. The occurrence of audio drops once again would indicate operation at the latency-playback quality threshold boundary and a decision would be made for settings that would be acceptable as described earlier. By one example, the jitter adjustment may be set by setting the capacity of the jitter buffer to a certain number of ms worth of audio frames as already described above for increasing the size of the jitter buffer.

Process 500 then may include "provide audio signal quality and/or latency adjustments" 530, which refers to actually applying the buffer size and/or PTS value corrections. This may include "form buffer size instructions" 532. The transmitter can configure the receiver buffer size via real-time transport protocol (RTP) control protocol (RTCP) messages which is a public standard from the Internet Engineering Task Force (IETF). See, RTP Control Protocol (RTCP) Extended Report (XR) Block for De-Jitter Buffer Metric Reporting details, section 1.1. The format used may be SDP (Session Descriptor Protocol) in RTCP messaging. This standard includes instructions to provide a packet for transmission to a receiver which may be used to control the de-jitter size. This is performed by configuring the jitter buffer nominal delay (JB nominal), jitter buffer maximum delay (JB maximum), and jitter buffer absolute maximum delay (JB abs max) parameters in the RTCP messaging from the transmitter to the receiver. Other protocols may be used as well as long as instructions can be transmitted from a source to a sink to control the jitter buffer size at the sink.

Process 500 may include "adjust PTS values" 534, and particularly, once the PTS offset is determined, if provided at all, the offset is applied to the PTS values originally set by the encoder as described below.

Process 500 may include "transmit instructions and/or PTS values in bitstream" 536, which refers to placing the instruction and the PTS values in the bitstream, and transmitting that data with the audio signal data to the receiver for implementation.

Process 500 may include "end of transmission?" 538. If the end of the transmission is reached, the process is stopped. Otherwise, the process loops to the beginning and may operate until the end of an AV sequence has been transmitted by the transmitter or rendered by the receiver. Otherwise, in order to save on processing power, a cycle to determine audio drops may be set to run at regular intervals rather than continuously.

Figure 8:
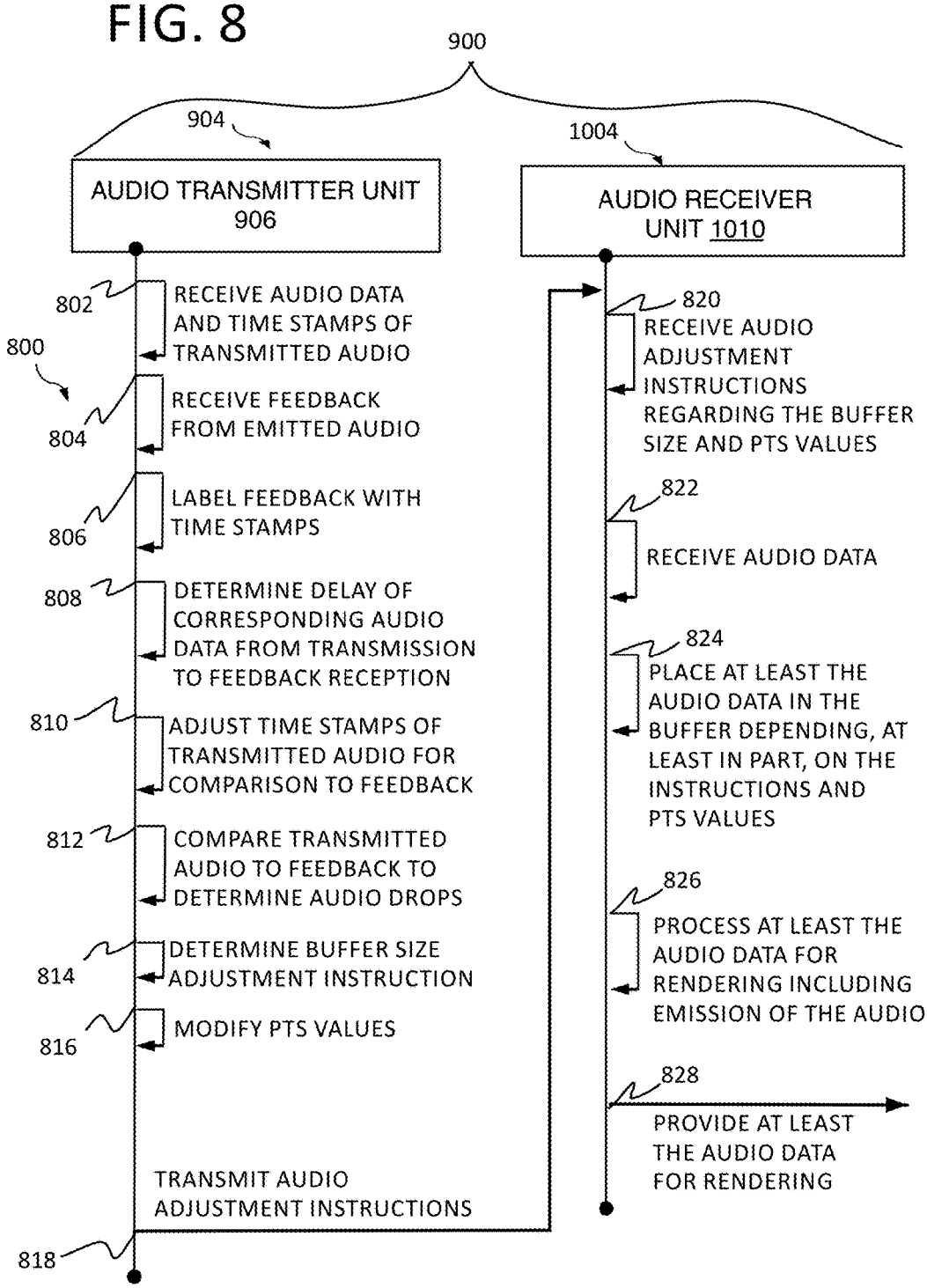
FIG. 8 is a schematic diagram of an audio quality and latency adjustment method for audio processing by using feedback and in operation.

Referring to FIG. 8, by another approach, process 800 illustrates the operation of a sample audio quality and latency adjustment system 900 that performs audio quality and latency adjustment for audio processing by using feedback in accordance with at least some implementations of the present disclosure. In more detail, in the illustrated form, process 800 may include one or more operations, functions or actions as illustrated by one or more of actions 802 to 828 numbered evenly. By way of non-limiting example, process 800 will be described herein with reference to FIGS. 9 and 10. Specifically, system 900 includes logic units 904 including an audio transmitter unit 906 that transmits audio (or audio and video) to a system 1000 with logic units 1004 including an audio receiver unit 1010. The operation of the systems 900 and 1000 may proceed as follows.

The process 800 provides the performance of an audio quality and latency adjustment process where a transmitter has its own microphone to receive the feedback of the audio signal the transmitter transmitted to a receiver that emitted the audio. In one form, the audio signal is wirelessly transmitted as audio data in a bitstream. The feedback is compared to a saved version of the transmitted audio signal at the transmitter to determine whether significant audio drops exist in the feedback. The transmitter then may adjust the audio data to be transmitted depending on the amount or pattern of audio drops formed in the feedback. By one form, this includes placing instructions in the audio data to change the capacity of a buffer of the receiver holding the frames of the audio signal being transmitted and ready for decoding and rendering. By other forms, this includes changing the PTS of the audio frames to reduce the amount of audio drops.

Thus, process 800 may include "receive audio data and time stamps of transmitted audio" 802, and particularly, receiving the non-encoded audio signal (which may be provided as frames or packets that form frames) as well as the transmission time stamps of the audio signal. These may be provided by the encoder, the multiplexer, transmission unit, or other unit. The transmission time stamps may be different from the PTS set to the encoder clock. The transmitter saves the audio signal which is a copy of a transmitted audio signal, and the transmission time stamps.

The process 800 then may include "receive feedback from emitted audio" 804, and specifically where the transmitter transmits the audio signal as audio data in a bitstream to a receiver, and the receiver then decodes and uses that audio data to emit the audio signal through one or more speakers. The transmitter has a microphone to capture the emitted audio as feedback of the originally transmitted audio signal. The process 800 also may include "label feedback with time stamps" 806, and in one form, an arrival time stamp as explained above for eventual correlation and comparison of the feedback to the saved audio signal, also as explained above.

The process 800 then may include "determine delay of corresponding audio data from transmission to feedback reception" 808, where the delay here is the delay from transmission of the audio to receipt of the audio back at the transmitter through the transmitter's microphone. Thus, to determine the delay, the same frame or audio on the saved audio signal must be matched (time-wise) to that on the feedback, and this is determined by the methods explained above, and may be determined by differencing the transmission time stamps of the saved audio signal and the corresponding arrival time stamps of the feedback. This correlates the saved audio signal with the feedback for the comparison between the two signals.

The process 800 may include "adjust time stamps of transmitted audio for comparison to feedback" 810. Once the length of the delay is determined, the time stamps of the saved audio signal are adjusted by the delay to create a "delayed" audio signal. The delayed audio signal is then compared to the feedback by matching the time stamps. It will be appreciated that the feedback's time stamps could be adjusted by the delay time instead.

The process 800 may include "compare transmitted audio to feedback to determine audio drops" 812. As described above, the delayed audio signal and feedback are compared by matching the signals at the same time stamps (after delay compensation). Wherever there are missing signal portions on the feedback that are not existing on the delayed audio signal, this indicates an audio drop. Whether or not to adjust the audio quality or latency depends on whether the duration and/or number of the audio drops meets a certain criteria or threshold as described above.

The process 800 then may include "determine buffer size adjustment instruction" 814, such that when audio drops are found in the feedback that meet a criteria, it may be assumed that the frames to the receiver's jitter buffer are early and dropped due to network congestion that bunches the frames and/or a jitter buffer that is too small. Otherwise, when audio drops are not present, or are not significant, the buffer size may be decreased to attempt to reduce latency as described above. The buffer sizes may be increased or decreased by amounts determined by experimentation or other methods also described above.

The process 800 may include "modify PTS values" 816. This operation includes shifting the PTS values when audio drops are present in the feedback and it is assumed that the audio drops were frames arriving late to the receiver's buffer due to network congestion for example. In this case, the PTS values from the encoder may be adjusted by an offset or error amount by the multiplexer or encoder at the transmitter. The PTS offset amount may be determined by trial and error using incremental corrections or may be determined by experimentation to develop a standard offset depending on the equipment of the receiver used. Other examples are contemplated. The PTS values are then provided in the MTS with the audio and video packets being transmitted.

As mentioned above, operations 814 and 816 may be performed in the alternative as a trial and error process, or in some sort of combination as described above, to find the best solution that provides better quality audio and/or reduces audio latency.

The process 800 may include "transmit audio adjustment instructions" 818. This operation includes placing the instructions to change a size of the receiver's buffer as explained above, by one example, using RTCP techniques.

The process 800 then may include "receive audio adjustment instructions regarding the buffer size and PTS values" 820, and "receive audio data" 822. This operation includes receiving the change of buffer size instructions by a control that controls the size of a dynamic jitter buffer, as well as receiving audio (or audio and video) data which may be de-multiplexed into encoded audio frames to be decoded.

The process 800 may include "place at least the audio data in the buffer depending, at least in part, on the instructions and PTS values" 824. This operation includes placing the audio data in the form of audio frames into the buffer when the PTS of the buffer, as adjusted by the PTS adjustment operation, is within a margin of the current decoder clock reading. The audio frame then may be placed in the buffer which now has a capacity as set by the buffer control and via the instructions for the buffer size transmitted to the receiver from the transmitter. The instructions, if provided, should have reduced the buffer size to reduce latency, or increased the buffer size to fit more frames in the buffer thereby reducing audio drops and increasing audio quality.

The process 800 then may include "process at least the audio data for rendering including emission of the audio" 826, such that the decoder may fetch the frames from the buffer when the decoder clock matches the PTS of a frame in the buffer. Once the decoder processing is complete, the process 800 may include "provide at least the audio data for rendering" 828, and particularly to another application that will use the audio data to emit an audio signal through one or more speakers as explained herein, as well as display video if present.

It will be appreciated that processes 400, 500, and/or 800 may be provided by sample audio processing systems 300, 900, and/or 1000 to operate at least some implementations of the present disclosure. In addition, any one or more of the operations of FIGS. 4, 5, and 8 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 9:
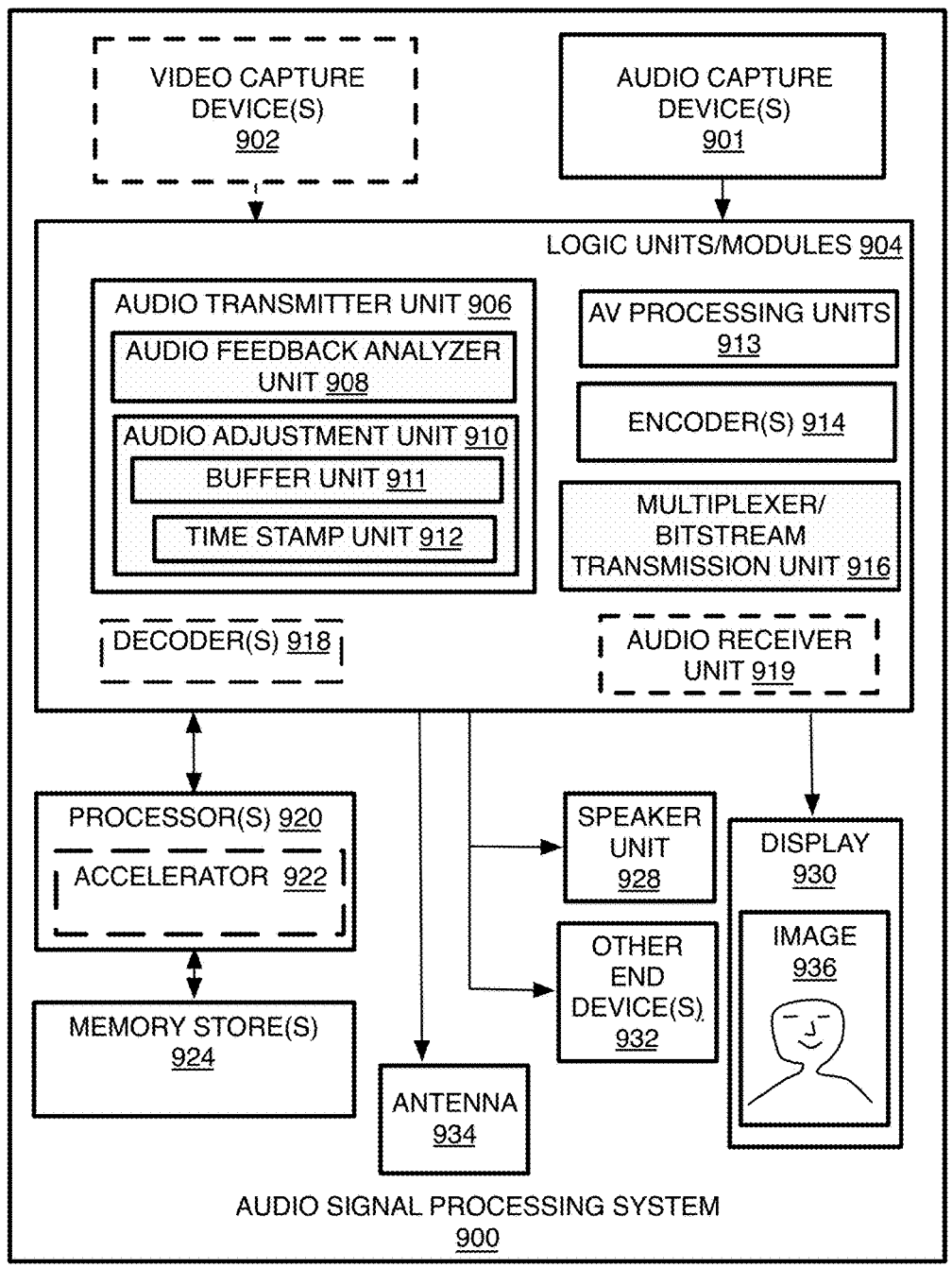
FIG. 9 is an illustrative diagram of an example system.
Figure 10:
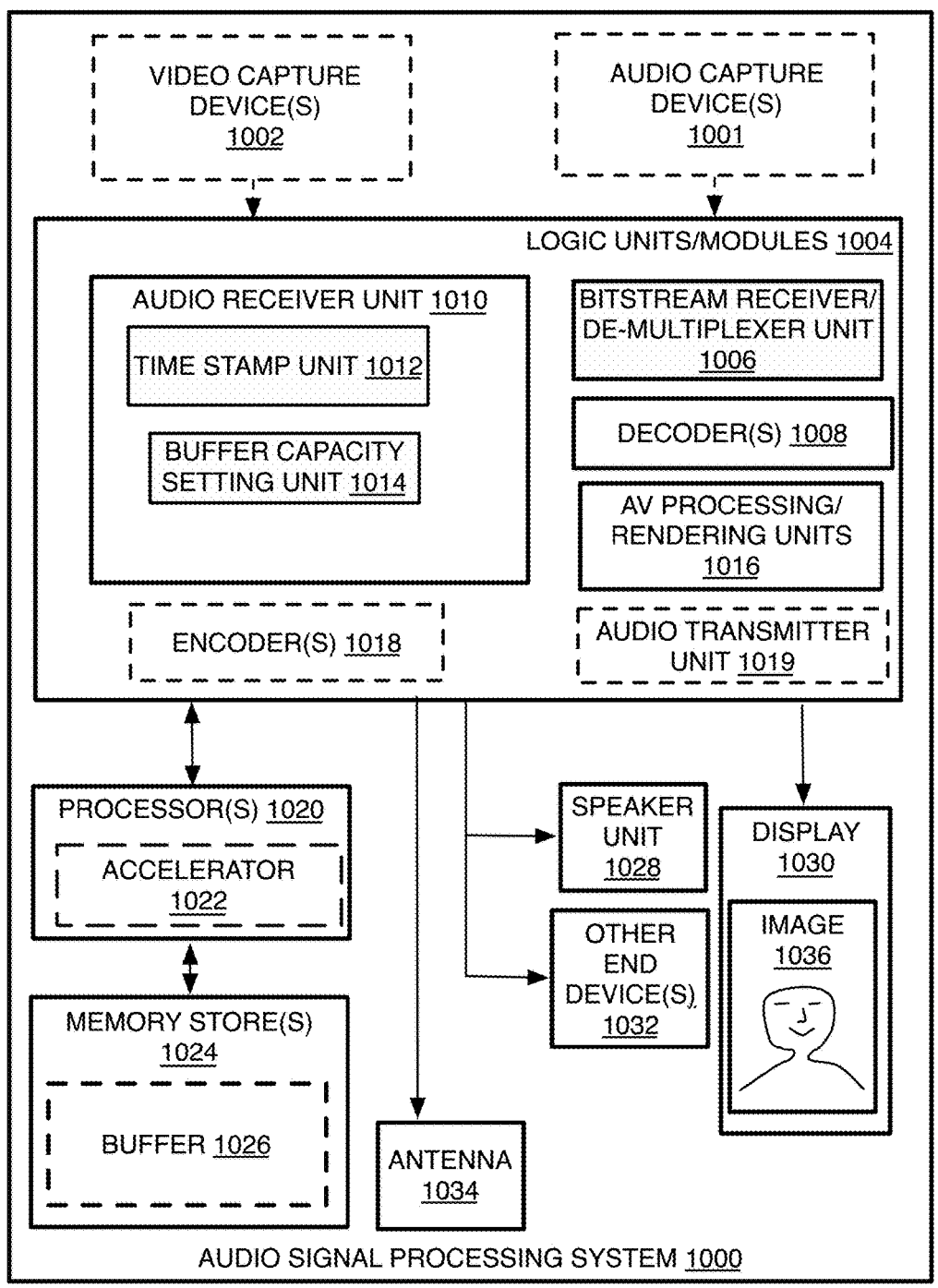
FIG. 10 is an illustrative diagram of an example system.

Referring to FIGS. 9-10, an example audio processing system 900 or 1000 is arranged in accordance with at least some implementations of the present disclosure. The system 900 may be a transmitter described in detail herein, and like features on system 1000 which may be a receiver are numbered similarly and need not be re-described.

In various implementations, the example transmitter 900 may have an audio/acoustic capture device(s) 901 to form or receive acoustical signal data such as the feedback described above. This can be implemented in various ways. Thus, in one form, the audio processing system 900 is a device, or is on a device, with a number of microphones. In other examples, the acoustic signal processing system 900 may be in communication with one or a network of microphones, and may be remote from these acoustic signal capture devices such that logic modules 904 may communicate remotely with, or otherwise may be communicatively coupled to, the microphones for further processing of the acoustic data.

In either case, such technology may include a telephone, a smart phone, a dictation machine, other sound recording machine, a mobile device or an on-board device, or any combination of these. Thus, in one form, audio capture device 901 may include audio capture hardware including one or more sensors as well as actuator controls. These controls may be part of a sensor module or component for operating the sensor. The sensor component may be part of the audio capture device 901, or may be part of the logical modules 904 or both. Such sensor component can be used to convert sound waves into an electrical acoustic signal. The audio capture device 901 also may have an A/D converter, other filters, and so forth to provide a digital signal for acoustic signal processing. The system 900 also may have one or more video capture devices 902 such as cameras for capturing images along with capturing the audio.

In the illustrated example, the logic modules 904 may include an AV processing unit 913 to obtain input audio or AV, and pre-process the AV data for encoding, an encoder 914 to code the AV data, a multiplexer/bitstream transmission unit 916 to package and transmit the audio data as well as an antenna 934 to perform the transmission to the receiver. The logic modules also may have an audio transmitter unit 906 that receives feedback from the audio capture device 901 and provides the feedback to an audio feedback analyzer unit 908, and then an audio adjustment unit 910. The audio adjustment unit 910 may have a buffer unit 911 and a time stamp shift unit 912. These units may be used to perform the audio quality and latency adjustment operations described above where relevant. Otherwise, the logic modules 904 also may include a decoder 918 and an audio receiver unit 919 to act as a receiver when needed.

The system 900 may have one or more processors 920 which may include a dedicated accelerator 922 such as the Intel Atom, memory stores 924 which may or may not hold the saved and delayed audio signal and transmission time stamps, at least one speaker unit 928 to emit audio when desired, one or more displays 930 to provide images 936 when desired, any other end device(s) 932, and antenna 934 as already mentioned above. In one example implementation, the image processing system 900 may have the audio capture device 901, at least one processor 920 communicatively coupled to the audio capture device 901, and at least one memory 924 communicatively coupled to the processor. The antenna 934 also may be provided to transmit other commands to the paired device or other devices. Otherwise, the feedback also may be stored in memory 924. As illustrated, any of these components may be capable of communication with one another and/or communication with portions of logic modules 904 and/or audio capture device 901. Thus, processors 920 may be communicatively coupled to the audio capture device 901, the logic modules 904, and the memory 924 for operating those components.

Although the transmitter 900, as shown in FIG. 9, may include one particular set of blocks or actions associated with particular components or modules, these blocks or actions may be associated with different components or modules than the particular component or module illustrated here.

Referring to FIG. 10, an acoustic system or receiver 1000 is shown and has many feature similar to the features of the transmitter and those similar features are numbered similarly to the numbering of the features on transmitter 900. Thus, these common feature need not be described any further. The differences between the system 900 and 1000 relevant here are as follows.

The system or receiver 1000 may have logic units or modules 1004 that include a bitstream receiver/de-multiplexer unit 1006 that receives a transmitted bitstream of audio or Av data over antenna 1034 for example, and de-multiplexes the data into separate audio and video frames with audio and video packets respectively. The de-multiplexer provides any of the functions mentioned herein including the placement of frames in a buffer 1026 as explained above. The logic modules also may include a decoder 1008 that fetches the audio frames from the buffer 1026, and an AV processing and rendering unit 1016 that emits audio signals from speaker unit 1028 for example, and may display video on display 1030. The logic modules also may include an audio receiver unit 1010 with a time stamp unit 1012 that handles adjusted PTS of audio frames received in the transmission, and a buffer control or capacity setting unit 1014 that changes the size of the buffer 1026 according to the implementations described herein. The logic modules also may include an encoder 1018 and an audio transmitter unit 1019 to be used when the receiver acts as a transmitter instead. The buffer 1026 may be located at memory 1034 and may be a jitter (or de-jitter) buffer that stores at least audio frames as described above. The other features of system 1000 are as described for system 900.

Figure 11:
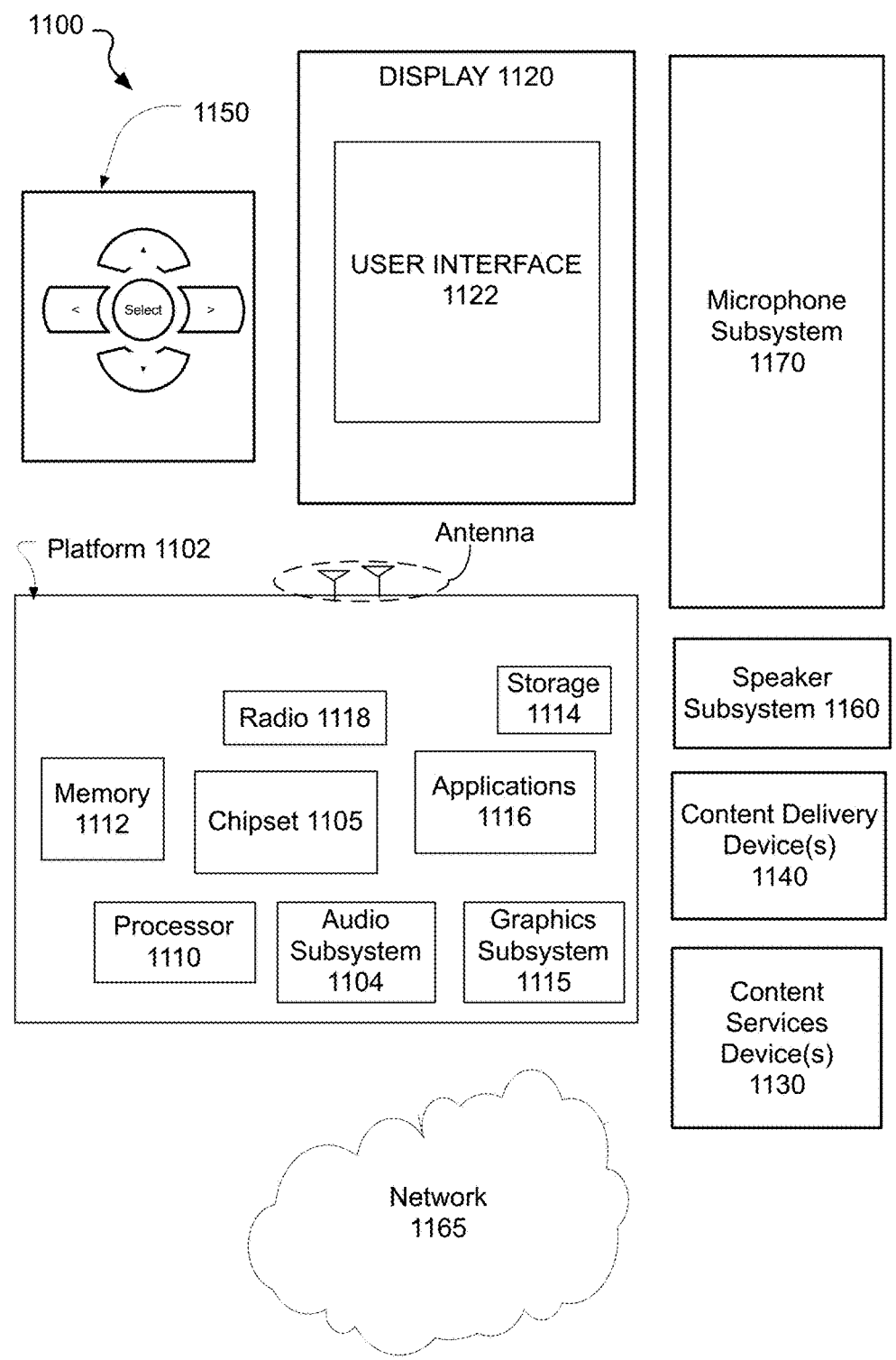
FIG. 11 is an illustrative diagram of another example system.

Referring to FIG. 11, an example system 1100 in accordance with the present disclosure operates one or more aspects of the audio processing system described herein and may be either a transmitter (source) or receiver (sink) as described herein. It will be understood from the nature of the system components described below that such components may be associated with, or used to operate, certain part or parts of the audio processing system described above. In various implementations, system 1100 may be a media system although system 1100 is not limited to this context. For example, system 1100 may be incorporated into one or more microphones of a network of microphones, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth, but otherwise any device having an acoustic signal analyzing device, and often a display device as well.

In various implementations, system 1100 includes a platform 1102 coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102, speaker subsystem 1160, microphone subsystem 1170, and/or display 1120. Each of these components is described in greater detail below.

In various implementations, platform 1102 may include any combination of a chipset 1105, processor 1110, memory 1112, storage 1114, audio subsystem 1104, graphics subsystem 1115, applications 1116 and/or radio 1118. Chipset 1105 may provide intercommunication among processor 1110, memory 1112, storage 1114, audio subsystem 1104, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Audio subsystem 1104 may perform processing of audio such as audio quality and latency adjustments based on feedback as described herein. The audio subsystem 1104 may comprise one or more processing units, memories, and accelerators. Such an audio subsystem may be integrated into processor 1110 or chipset 1105. In some implementations, the audio subsystem 1104 may be a stand-alone card communicatively coupled to chipset 1105. An interface may be used to communicatively couple the audio subsystem 1104 to a speaker subsystem 1160, microphone subsystem 1170, and/or display 1120.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, Display Port, wireless HDMI, and/or wireless HD compliant techniques. Graphics subsystem 1115 may be integrated into processor 1110 or chipset 1105. In some implementations, graphics subsystem 1115 may be a stand-alone card communicatively coupled to chipset 1105.

The audio processing techniques described herein may be implemented in various hardware architectures. For example, audio functionality may be integrated within a chipset. Alternatively, a discrete audio processor may be used. As still another implementation, the audio functions may be provided by a general purpose processor, including a multi-core processor. In further implementations, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), wireless display (WiDis) to establish Pan or mirroring networks, cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120, speaker subsystem 1160, and microphone subsystem 1170. Platform 1102 and/or content services device(s) 1130 may be coupled to a network 1165 to communicate (e.g., send and/or receive) media information to and from network 1165. Content delivery device(s) 1140 also may be coupled to platform 1102, speaker subsystem 1160, microphone subsystem 1170, and/or to display 1120.

In various implementations, content services device(s) 1130 may include a network of microphones, a cable television box, personal computer, network, telephone, Internet enabled devices or appliance capable of delivering digital information and/or content, and any other similar device capable of unidirectionally or bidirectionally communicating content between content providers and platform 1102 and speaker subsystem 1160, microphone subsystem 1170, and/or display 1120, via network 1165 or directly. It will be appreciated that the content may be communicated unidirectionally and/or bidirectionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In implementations, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures. The audio subsystem 1104 also may be used to control the motion of articles or selection of commands on the interface 1122.

Movements of the navigation features of controller 1150 may be replicated on a display (e.g., display 1120) by movements of a pointer, cursor, focus ring, or other visual indicators displayed on the display or by audio commands. For example, under the control of software applications 1116, the navigation features located on navigation controller 1150 may be mapped to virtual navigation features displayed on user interface 1122, for example. In implementations, controller 1150 may not be a separate component but may be integrated into platform 1102, speaker subsystem 1160, microphone subsystem 1170, and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example, or by auditory command. Program logic may allow platform 1102 to stream content to media adaptors or other content services device(s) 1130 or content delivery device(s) 1140 even when the platform is turned "off." In addition, chipset 1105 may include hardware and/or software support for 8.1 surround sound audio and/or high definition (7.1) surround sound audio, for example. Drivers may include an auditory or graphics driver for integrated auditory or graphics platforms. In implementations, the auditory or graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various implementations, platform 1102, speaker subsystem 1160, microphone subsystem 1170, and/or display 1120 may be an integrated unit. Display 1120, speaker subsystem 1160, and/or microphone subsystem 1170 and content service device(s) 1130 may be integrated, or display 1120, speaker subsystem 1160, and/or microphone subsystem 1170 and content delivery device(s) 1140 may be integrated, for example. These examples are not meant to limit the present disclosure.

In various implementations, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video and audio, electronic mail ("email") message, voice mail message, alphanumeric symbols, graphics, image, video, audio, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 11.

Figure 12:
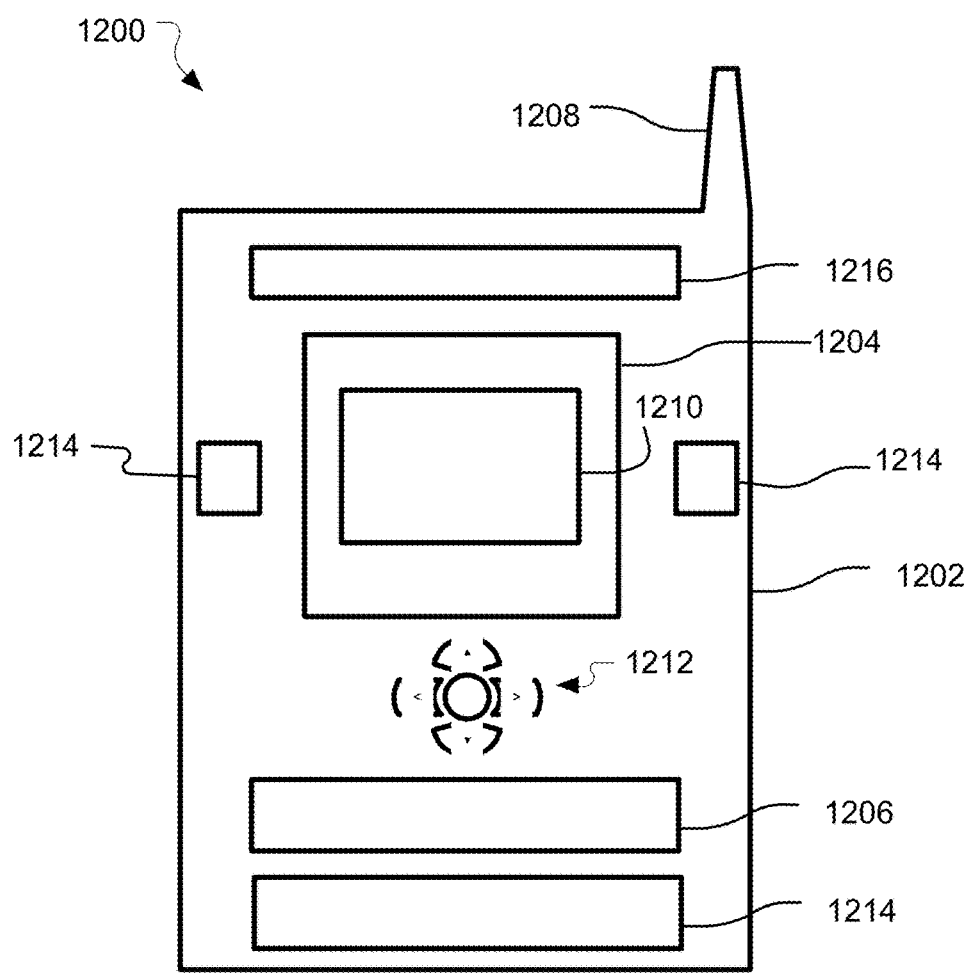
FIG. 12 illustrates another example device, all arranged in accordance with at least some implementations of the present disclosure.

Referring to FIG. 12, a small form factor device 1200 is one example of the varying physical styles or form factors in which system 300, 900, 1000, or 1100 may be embodied. By this approach, device 1200 may be implemented as a mobile computing device having wireless capabilities. A mobile computing device may refer to any device having a processing system and a mobile power source or supply, such as one or more batteries, for example.

As described above, examples of a mobile computing device may include any device with an audio sub-system such as a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, speaker system, and/or microphone system or network.

Examples of a mobile computing device also may include computers that are arranged to be worn by a person, such as a head-phone, head band, hearing aide, wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 12, device 1200 may include a housing 1202, a display 1204 including a screen 1210, an input/output (I/O) device 1206, and an antenna 1208. Device 1200 also may include navigation features 1212. Display 1204 may include any suitable display unit for displaying information appropriate for a mobile computing device. I/O device 1206 may include any suitable I/O device for entering information into a mobile computing device. Examples for I/O device 1206 may include an alphanumeric keyboard, a numeric keypad, a touch pad, input keys, buttons, switches, rocker switches, software and so forth. Information also may be entered into device 1200 by way of a network of two or more microphones 1214. Such information may be processed by an audio transmitter or source as described herein and as part of the device 1200, and may provide audio via a speaker 1216 or visual responses via screen 1210. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one implementation, a computer-implemented method comprises transmitting at least audio data comprising at least an audio signal to be received by a receiver to directly or indirectly emit the audio signal; receiving, by using a microphone device, feedback of the emitted audio signal; and adjusting the audio data to be transmitted depending, at least in part, on the feedback.

The method also may comprise adjusting the audio data to adjust the quality of the audio signal to be transmitted depending on the feedback; adjusting the audio data to adjust the latency of the audio signal to be transmitted and wherein the latency is from a time of processing or rendering of audio on a transmitting device to the time of emission of the same audio on the receiver, and depending on the feedback, wherein the at least audio data comprises a sequence of frames and buffer control data to configure a buffer at the receiver that holds the audio frames or audio and video frames, and wherein the buffer control data comprises instructions to change the number of frames to be held by the buffer, and depending on the feedback; adjusting the quality of the audio of an audio signal to be transmitted by increasing the number of frames that can be held by the buffer; changing the number of frames that can be held by the buffer depending on, at least in part, whether or not audio drops are detected in the feedback; increasing the number of frames that can be held by the buffer depending on whether at least a minimum amount of audio drops are detected in the feedback; adjusting the latency of the audio by providing instructions in the buffer data to decrease the number of frames that can be held by the buffer when there are fewer audio drops in the feedback than a maximum amount of audio drops; and shifting the values of time stamps of the frames when it is determined that the feedback comprises at least a minimum amount of audio drops.

By another implementation, a transmitter of a system of audio processing comprises a bitstream transmission unit to transmit at least audio data comprising at least an audio signal to be received by a receiver to directly or indirectly emit the audio signal; an audio capture device that captures feedback of the audio emitted by the receiver; and an audio adjustment unit that adjusts the audio data to be transmitted in the bitstream depending on the feedback.

The transmitter also may comprise delaying a copy of the audio signal to attempt to correlate the audio signal with the feedback that corresponds to the audio signal, and by delaying the audio signal so that time stamps of the audio signal correspond to time stamps of the feedback; using the results of the correlation to determine whether the feedback is too noisy to compare the audio signal to the feedback to determine whether audio drops exist in the feedback; comparing the delayed copy of the audio signal with the corresponding feedback to determine whether the feedback indicates audio drops within the feedback; omitting a comparison of the audio signal to the feedback unless it is determined that noise in the feedback is below a maximum level; wherein the audio adjustment unit provides instructions in the audio data to change the capacity of a buffer at the receiver depending, at least in part, on the feedback; wherein the audio data comprises instructions that at least one of: increases the capacity of the buffer when audio drops above a maximum amount are present in the feedback, and decreases the capacity of the buffer when fewer audio drops are present than a maximum threshold; and wherein the audio adjustment unit shifts the time stamps of frames of an audio signal when audio drops are found in the feedback.

By yet another implementation, a receiver of a system of audio processing comprises a bitstream receiver unit arranged to receive at least audio data of at least an audio signal; and an audio emission unit that emits the audio signal to be audible to a transmitter to provide feedback to the transmitter, wherein the bitstream receiver unit is arranged to receive audio data adjusted by the transmitter according to the feedback.

By another example, at least one computer readable medium comprising a plurality of instructions that in response to being executed on a computing device, causes the computing device to: transmit at least audio data comprising at least an audio signal to be received by a receiver to directly or indirectly emit the audio signal; receive, by using a microphone device, feedback of the emitted audio signal; and adjust the audio data to be transmitted depending, at least in part, on the feedback.

The instructions also cause the computing device to adjust the audio data to adjust the quality of the audio signal to be transmitted depending on the feedback; adjust the audio data to adjust the latency of the audio signal to be transmitted and wherein the latency is from a time of processing or rendering of audio on a transmitting device to the time of emission of the same audio on the receiver, and depending on the feedback, wherein the at least audio data comprises a sequence of frames and buffer control data to configure a buffer at the receiver that holds the audio frames or audio and video frames, and wherein the buffer control data comprises instructions to change the number of frames to be held by the buffer, and depending on the feedback; adjust the quality of the audio of an audio signal to be transmitted by increasing the number of frames that can be held by the buffer; change the number of frames that can be held by the buffer depending on, at least in part, whether or not audio drops are detected in the feedback; increase the number of frames that can be held by the buffer depending on whether at least a minimum amount of audio drops are detected in the feedback; adjust the latency of the audio by providing instructions in the buffer data to decrease the number of frames that can be held by the buffer when there are fewer audio drops in the feedback than a maximum amount of audio drops; and shift the values of \time stamps of the frames when it is determined that the feedback comprises at least a minimum amount of audio drops.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of audio processing comprising:
    transmitting at least audio data comprising at least an audio signal to be received by a receiver to directly or indirectly emit the audio signal;
    receiving, by using a microphone device, feedback of the emitted audio signal;
    correlating the audio data and the feedback comprising determining which frames in the audio signal match frames in the feedback;
    using the correlation to determine whether the feedback is too noisy to be used to determine whether the feedback indicates audio drops; and
    adjusting the audio data to be transmitted depending, at least in part, on the feedback.

2. The method of claim 1 comprising adjusting the audio data to adjust the quality of the audio signal to be transmitted depending on the feedback.

3. The method of claim 1 comprising adjusting the audio data to adjust the latency of the audio signal to be transmitted and wherein the latency is from a time of processing or rendering of audio on a transmitting device to the time of emission of the same audio on the receiver, and depending on the feedback.

4. The method of claim 1 wherein the at least audio data comprises a sequence of frames and buffer control data to configure a buffer at the receiver that holds the audio frames or audio and video frames.

5. The method of claim 4 wherein the buffer control data comprises instructions to change the number of frames to be held by the buffer, and depending on the feedback.

6. The method of claim 4 comprising adjusting the quality of the audio of an audio signal to be transmitted by increasing the number of frames that can be held by the buffer.

7. The method of claim 4 comprising changing the number of frames that can be held by the buffer depending on, at least in part, whether or not audio drops are detected in the feedback.

8. The method of claim 4 comprising increasing the number of frames that can be held by the buffer depending on whether at least a minimum amount of audio drops are detected in the feedback.

9. The method of claim 4 comprising adjusting the latency of the audio by providing instructions in the buffer data to decrease the number of frames that can be held by the buffer.

10. The method of claim 4 comprising adjusting the latency of the audio by providing instructions in the buffer data to decrease the number of frames that can be held by the buffer when there are fewer audio drops in the feedback than a maximum amount of audio drops.

11. The method of claim 1 comprising shifting the values of time stamps of the frames when it is determined that the feedback comprises at least a minimum amount of audio drops.

12. The method of claim 1 comprising:
    adjusting the audio data to adjust the quality of the audio signal to be transmitted depending on the feedback;
    adjusting the audio data to adjust the latency of the audio signal to be transmitted and wherein the latency is from a time of processing or rendering of audio on a transmitting device to the time of emission of the same audio on the receiver, and depending on the feedback, wherein the at least audio data comprises a sequence of frames and buffer control data to configure a buffer at the receiver that holds the audio frames or audio and video frames, and wherein the buffer control data comprises instructions to change the number of frames to be held by the buffer, and depending on the feedback;
    adjusting the quality of the audio of an audio signal to be transmitted by increasing the number of frames that can be held by the buffer;
    changing the number of frames that can be held by the buffer depending on, at least in part, whether or not audio drops are detected in the feedback;
    increasing the number of frames that can be held by the buffer depending on whether at least a minimum amount of audio drops are detected in the feedback;
    adjusting the latency of the audio by providing instructions in the buffer data to decrease the number of frames that can be held by the buffer when there are fewer audio drops in the feedback than a maximum amount of audio drops; and
    shifting the values of time stamps of the frames when it is determined that the feedback comprises at least a minimum amount of audio drops.

13. A transmitter of a system of audio processing comprising:
    a bitstream transmission unit to transmit at least audio data comprising at least an audio signal to be received by a receiver to directly or indirectly emit the audio signal;
    an audio capture device that captures feedback of the audio emitted by the receiver;
    an audio feedback analyzer unit to:
        correlate the audio data and the feedback comprising determining which frames in the audio signal match frames in the feedback, and
        use the correlation to determine whether the feedback is too noisy to be used to determine whether the feedback indicates audio drops; and
    an audio adjustment unit that adjusts the audio data to be transmitted in the bitstream depending on the feedback.

14. The transmitter of claim 13 wherein the audio feedback analyzer unit is to operate by delaying a copy of the audio signal to correlate the audio signal with the feedback that corresponds to the audio signal, and by delaying the audio signal so that time stamps of the audio signal correspond to time stamps of the feedback.

15. The transmitter of claim 14 wherein the audio feedback analyzer unit is to operate by comparing the delayed copy of the audio signal with the corresponding feedback to determine whether the feedback indicates audio drops within the feedback.

16. The transmitter of claim 13 wherein the audio feedback analyzer unit is to operate by omitting a comparison of the audio signal to the feedback unless it is determined that noise in the feedback is below a maximum level.

17. The transmitter of claim 13 wherein the audio adjustment unit provides instructions in the audio data to change the capacity of a buffer at the receiver depending, at least in part, on the feedback.

18. The transmitter of claim 17 wherein the audio data comprises instructions that at least one of:
increases the capacity of the buffer when audio drops above a maximum amount are present in the feedback, and
decreases the capacity of the buffer when fewer audio drops are present than a maximum threshold.

19. The transmitter of claim 13 wherein the audio adjustment unit shifts the time stamps of frames of an audio signal when audio drops are found in the feedback.

20. The transmitter of claim 13 wherein the audio feedback analyzer unit is to operate by:
delaying a copy of the audio signal to attempt to correlate the audio signal with the feedback that corresponds to the audio signal, and by delaying the audio signal so that time stamps of the audio signal correspond to time stamps of the feedback;
comparing the delayed copy of the audio signal with the corresponding feedback to determine whether the feedback indicates audio drops within the feedback; and
omitting a comparison of the audio signal to the feedback unless it is determined that noise in the feedback is below a maximum level;
wherein the audio adjustment unit provides instructions in the audio data to change the capacity of a buffer at the receiver depending, at least in part, on the feedback;
wherein the audio data comprises instructions that at least one of:
increases the capacity of the buffer when audio drops above a maximum amount are present in the feedback, and
decreases the capacity of the buffer when fewer audio drops are present than a maximum threshold; and
wherein the audio adjustment unit shifts the time stamps of frames of an audio signal when audio drops are found in the feedback.

21. A receiver of a system of audio processing comprising:
a bitstream receiver unit arranged to receive at least audio data of at least an audio signal; and
an audio emission unit that emits the audio signal to be audible to a transmitter to provide feedback to the transmitter, wherein the transmitter having an audio feedback analyzer unit to:
correlate the audio data and the feedback comprising determining which frames in the audio signal match frames in the feedback, and
use the correlation to determine whether the feedback is too noisy to be used to determine whether the feedback indicates audio drops; and
wherein the bitstream receiver unit is arranged to receive audio data adjusted by the transmitter according to the feedback.

22. The receiver of claim 21 comprising
a buffer to hold frames of the audio signal; and
at least one of:
a buffer capacity setting unit that receives instructions from the audio data to change a frame capacity of the buffer, and
a time stamp unit that compares time stamps of the frames and from the audio data, and compared to a clock to determine whether a frame is to be placed in the buffer, wherein the time stamps of the frames are to be adjusted by the transmitter depending on the feedback.

23. At least one non-transitory computer readable medium comprising a plurality of instructions that in response to being executed on a computing device, causes the computing device to:
transmit at least audio data comprising at least an audio signal to be received by a receiver to directly or indirectly emit the audio signal;
receive, by using a microphone device, feedback of the emitted audio signal;
correlate the audio data and the feedback comprising determining which frames in the audio signal match frames in the feedback,
use the correlation to determine whether the feedback is too noisy to be used to determine whether the feedback indicates audio drops; and
adjust the audio data to be transmitted depending, at least in part, on the feedback.

24. The medium of claim 23, wherein the instructions cause the computing device to:
adjust the audio data to adjust the quality of the audio signal to be transmitted depending on the feedback;
adjust the audio data to adjust the latency of the audio signal to be transmitted and wherein the latency is from a time of processing or rendering of audio on a transmitting device to the time of emission of the same audio on the receiver, and depending on the feedback, wherein the at least audio data comprises a sequence of frames and buffer control data to configure a buffer at the receiver that holds the audio frames or audio and video frames, and wherein the buffer control data comprises instructions to change the number of frames to be held by the buffer, and depending on the feedback;
adjust the quality of the audio of an audio signal to be transmitted by increasing the number of frames that can be held by the buffer;
change the number of frames that can be held by the buffer depending on, at least in part, whether or not audio drops are detected in the feedback;
increase the number of frames that can be held by the buffer depending on whether at least a minimum amount of audio drops are detected in the feedback;
adjust the latency of the audio by providing instructions in the buffer data to decrease the number of frames that can be held by the buffer when there are fewer audio drops in the feedback than a maximum amount of audio drops; and
shift the values of time stamps of the frames when it is determined that the feedback comprises at least a minimum amount of audio drops.

* * * * *